(12) United States Patent
Turner et al.

(10) Patent No.: US 9,607,104 B1
(45) Date of Patent: Mar. 28, 2017

(54) SYSTEMS AND METHODS OF USING A BITMAP INDEX TO DETERMINE BICLIQUES

(71) Applicant: Umbel Corporation, Austin, TX (US)

(72) Inventors: Travis Turner, Austin, TX (US); Ryan Edward Ebanks, Austin, TX (US); Kevin Troy Safford, Austin, TX (US); Matthew Isaac Jaffee, Austin, TX (US); Todd Wesley Gruben, Cedar Park, TX (US); Cody Stephen Soyland, Austin, TX (US); Higinio O. Maycotte, Austin, TX (US); Charles Martin, Austin, TX (US)

(73) Assignee: UMBEL CORPORATION, Austin, TX (US)

(*) Notice: Subject to any disclaimer, the term of this patent is extended or adjusted under 35 U.S.C. 154(b) by 0 days.

(21) Appl. No.: 15/143,021

(22) Filed: Apr. 29, 2016

(51) Int. Cl.
  *G06F 17/30* (2006.01)
(52) U.S. Cl.
  CPC .. *G06F 17/30979* (2013.01); *G06F 17/30864* (2013.01); *G06F 17/30958* (2013.01)
(58) Field of Classification Search
  None
  See application file for complete search history.

(56) References Cited

U.S. PATENT DOCUMENTS

| | | |
|---|---|---|
| 5,907,297 A | 5/1999 | Cohen et al. |
| 6,341,281 B1 | 1/2002 | MacNicol |
| 7,689,630 B1 | 3/2010 | Lam |
| 8,074,206 B2 | 12/2011 | Sauermann |
| 8,214,390 B2 | 7/2012 | Watfa |
| 8,255,386 B1 | 8/2012 | Annau et al. |
| 2003/0061227 A1 | 3/2003 | Baskins |
| 2003/0154189 A1 | 8/2003 | Egilsson |
| 2004/0249782 A1 | 12/2004 | Ricci |
| 2008/0270374 A1 | 10/2008 | Li |
| 2009/0037492 A1 | 2/2009 | Baitalmal et al. |
| 2010/0106605 A1 | 4/2010 | Lin et al. |
| 2012/0209873 A1 | 8/2012 | He |
| 2012/0254144 A1 | 10/2012 | Borkovsky et al. |

(Continued)

OTHER PUBLICATIONS

Zhang, et al., "On Finding Bicliques in Bipartite Graphs: A Novel Algorithm and its Application to the Integration of Diverse Biological Data Types", BioMed Central, BMC Bioinformatics, 2014.

(Continued)

*Primary Examiner* — Belix M Ortiz Ditren
(74) *Attorney, Agent, or Firm* — Toler Law Group, P.C.

(57) ABSTRACT

A method includes receiving, at a computing device comprising a processor, a request to determine bicliques in a graph, where the graph includes a first set of nodes, a second set of nodes, and a set of edges, each edge in the set of edges connecting a node in the first set of nodes to a node in the second set of nodes. The method also includes determining at least one biclique based on querying a bitmap index representing the graph, where the bitmap index includes a plurality of bit strings corresponding to the first set of nodes, and where a value stored in a particular location in each bit string indicates whether an edge connects a first node corresponding to the bit string to a second node corresponding to the particular location.

19 Claims, 34 Drawing Sheets

(56) References Cited

U.S. PATENT DOCUMENTS

| | | | |
|---|---|---|---|
| 2013/0086017 A1* | 4/2013 | Chao | G06F 17/30946 707/698 |
| 2013/0159298 A1* | 6/2013 | Mason | G06F 17/30867 707/728 |
| 2014/0075018 A1 | 3/2014 | Maycotte et al. | |
| 2014/0114738 A1 | 4/2014 | Tseng et al. | |

OTHER PUBLICATIONS

Wu, et al., "FastBit: Interactively Searching Massive Data", 2009, retrieved on Apr. 28, 2014 via internet: http://iopscience.iop.org/1742-6596/180/1/012053,, 10 pp.

Mukherjee, et al., "Enumerating Maximal Bicliques from a Large Graph Using MapReduce", IEEE Transactions on Services Computing, Apr. 2014, 14 pp.

Damaschke, Peter, "Enumerating Maximal Bicliques in Bipartite Graphs with Favorable Degree Sequences", Journal—Information Processing Letters, vol. 114, Issue 6, Jun. 2014, 7 pp.

Zhang Yun, "Scalable Graph Algorithms with Applications in Genetics", PhD Dissertation, University of Tennessee, Dec. 2008, 94 pp.

"Agile and Scalable", "Agile and Scalable", copyright 2013 MongoDB, Inc., 3 pages, retrieved on Dec. 18, 2013 from http://www.mongodb.org/, 3 pages.

"Amazon Elastic MapReduce (Amazon EMR)", "Amazon Elastic MapReduce (Amazon EMR)", Amazon Web Services, 1 page, retrieved on Dec. 18, 2013 from http://aws.amazon.com/elasticmapreduce/, 1 page.

"Apache Cassandra", "Apache Cassandra", Wikipedia, developed by Lakshman et al., Apache Software Foundation, DataStax, 10 pages, retrieved on Dec. 18, 2013 from http://en.wikipedia.org/wiki/Apache_Cassandra, 10 pages.

"AWS/Amazon Redshift (Beta) Cloud Data Warehouse Solutions", "AWS/Amazon Redshift (Beta) Cloud Data Warehouse Solutions", Amazon Web Services, 1 page, retrieved on Dec. 18, 2013 from http://aws.amazon.com/redshift/, 1 page.

"Bit array", "Bit array", Wikipedia, 7 pages, retrieved on Dec. 18, 2013 from http://en.wikipedia.org/wiki/Bit_array, 7 pages.

"Consistent hashing", "Consistent hashing", Wikipedia, retrieved on Dec. 18, 2013 from http://en.wikipedia.org/wiki/Consistent_hashing, 4 pages.

"Elasticsearch", "Elasticsearch", Wikipedia, developed by Shay Banon, 3 pages, retrieved on Dec. 18, 2013 from http://en.wikipedia.org/wiki/ElasticSearch, 3 pages.

"FastBit: An Efficient Compressed Bitmap Index Technology", "FastBit: An Efficient Compressed Bitmap Index Technology", 3 pages, retrieved on Dec. 18, 2013 from https://sdm.lbl.gov/fastbit/, 3 pages.

"Lucene", "Lucene", Wikipedia, developed by Apache Software Foundation, 3 pages, retrieved on Dec. 18, 2013 from http://en.wikipedia.org/wiki/Lucene, 3 pages.

"MapReduce", "MapReduce", Wikipedia, 12 pages, retrieved on Dec. 18, 2013 from http://en.wikipedia.org/wiki/MapReduce, 12 pages.

"Pivotal Greenplum Database", "Pivotal Greenplum Database", Enable Analytic Innovation, 13 pages, retrieved on Dec. 18, 2013 from http://www.gopivotal.com/products/pivotal-greenplum-database, 13 pages.

"Project-z/mutton, GitHub, The core bitmapping indexing code for project-z", Project-z/mutton, GitHub, The core bitmapping indexing code for project-z, 2013 GitHub, Inc., 2 pages, retrieved on Dec. 18, 2013 from https://github.com/project-z/mutton, 2 pages.

"Riak/Basho", "Riak/Basho", 4 pages, retrieved on Dec. 18, 2013 from http://basho.com/riak/, 4 pages.

"Cassandra Summit 2013: Cassandra on Flash Performance & Efficiency Lesson, slideshare, Planet Cassandra Community, Real-Time Large Querie", Cassandra Summit 2013: Cassandra on Flash Performance & Efficiency Lesson, slideshare, Planet Cassandra Community, Real-Time Large Queries, retrieved on Dec. 18, 2013 from http://www.slideshare.net/planetcassandra/1-matt-stump#, 13 pages.

"EsperTech Event Series Intelligence, Where Complex Event Processing meets Open Source", EsperTech Event Series Intelligence, Where Complex Event Processing meets Open Source; Esper & NEsper, 2 pages, copyright 2006-2013, EsperTech, Inc., retrieved on Dec. 18, 2013 from http://www.espertech.com/, 2 pages.

"Nathanmarz/storm", Nathanmarz/storm, GitHub, last edited by P. Taylor Goetz, Nov. 6, 2013, 2013 GitHub, Inc., 2 pages, retrieved on Dec. 18, 2013 from http://stormproject.net/, 2 pages.

"Open Source Distributed Real Time Search & Analytics/Elasticseach", Open Source Distributed Real Time Search & Analytics/Elasticseach, retrieved on Dec. 18, 2013 from http://www.elasticsearch.org/, 14 pages.

Babcock, et al., ""Distributed Top-K Monitoring"", "Distributed Top-K Monitoring", Brian Babcock et al., SIGMOD 2003, 24 pages, retrieved on Dec. 18, 2013 from http://infolab.stanford.edu/~olston/publications/topk.pdf, 24 pages.

Bayer, ""The Absolutely Simplest Consistent Hashing Example"", zzzeek, Mostly Computer Stuff, "The Absolutely Simplest Consistent Hashing Example", Mike Bayer, Jul. 7, 2012; 5 pages, retrieved on Dec. 18, 2013 from http://techspot.zzzeek.org/2012/07/07/the-absolutely-simplest-consistent-hashing-example/, Jul. 7, 2012, 5 pages.

Colantonia, et al., ""Concise: Compressed 'n' Composable Integer Set"", "Concise: Compressed 'n' Composable Integer Set", A. Colantonio and R. Di Pietro, Universita di Roma Tre, Roma Italy, May 21, 2010, 8 pages, retrieved on Dec. 18, 2013 from http://ricerca.mat.uniroma3.it/users/colanton/docs/concise.pdf, 8 pages.

Dean, J., et al., ""MapReduce: Simplified Data Processing on Large Clusters"", Dean, J. et al., "MapReduce: Simplified Data Processing on Large Clusters", Google, Inc., OSDI'04: Sixth Symposium on Operating System Design and Implentation, San Francisco, CA, Dec. 2004, 13 pages., Dec. 2004, 13 pages.

Gosink, et al., ""Bin-Hash Indexing: A Parallel GPU-Based Method for Fast Query Processing"", IDAV, Institute for Data Analysis and Visualization, "Bin-Hash Indexing: A Parallel GPU-Based Method for Fast Query Processing", Luke Gosink et al., Technical Report LBNL-729e, Laurence Berkeley National Laboratories, 2008, 4 pages, retrieved on Dec. 1, 4 pages.

Ihab F. Iiyas, et al., ""A Survey of Top-k Query Processing Techniques in Relational Database Systems"", "A Survey of Top-k Query Processing Techniques in Relational Database Systems", Ihab F. Iiyas et al., University of Waterloo, ACM Computing Surveys, vol. 40, No. 4, Article 11, Oct. 2008, 58 pages, retrieved on Dec. 18, 2013 from https://cs.uwaterloo.c, Oct. 2008, 58 pages.

Lemire, ""Sorting improves word-aligned bitmap indexes"", "Sorting improves word-aligned bitmap indexes", D. Lemire et al., Dec. 5, 2009, Computer Science Databases, Cornell University Library, 43 pages, retrieved on Dec. 18, 2013 from http://arxiv.org/pdf/0901.3751v4, 43 pages.

Stockinger, et al., "Using Bitmap Index for Joint Queries on Structured and Text Data", 2009, 23 pp.

* cited by examiner

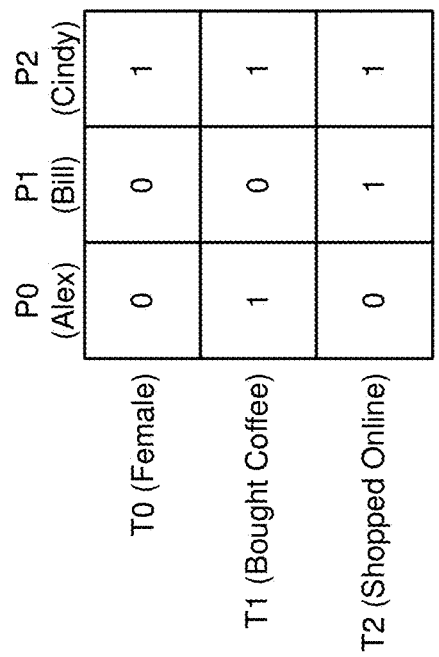
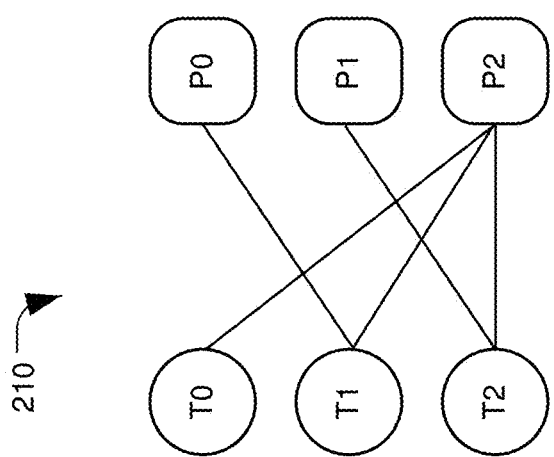
FIG. 2

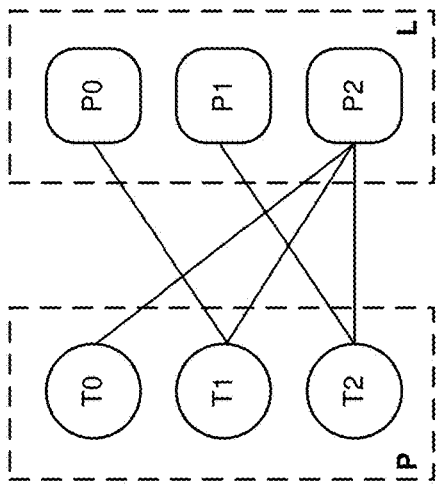

```
biclique_find(G, L, R, P, Q)
  //G is the Graph
  //E is the set of all edges in G
  While P ≠ {}
    P' = {}; Q'={};
    Select x from P
    P←P/{x} //remove x from P
    R'←R U {x} //add x to R'
    L'←{u ∈ L | (u,x) ∈ E(G)} //set L' to all nodes of L that are connected to x
    For all v ∈ Q
      If v is connected to all nodes in L'
        GoTo EXPANDQ //the biclique {L, R} is not maximal, and because R does
                      //not include v, no biclique based on v is maximal.
      Else If v is not connected to all nodes in L'
        Q'←Q' U {v}
    EndFor
    //candidate biclique has been found, so iterate over P to confirm maximality
    For all v ∈ P, v ≠ x
      If v connects to all nodes of L',
        R'←R U {v} //because v also connects to all nodes of L' (like x), add v to R'
      Else if v connects to at least one node of L'
        P'←P' U {v} //prepare for recursive call
    EndFor
    Output {L';R'} as a maximal biclique
    If P' ≠ {}
      biclique_find(G, L', R', P', Q') //recurse if P' is non-empty
    EXPANDQ: Q←Q U {x}
  EndWhile
```

FIG. 3

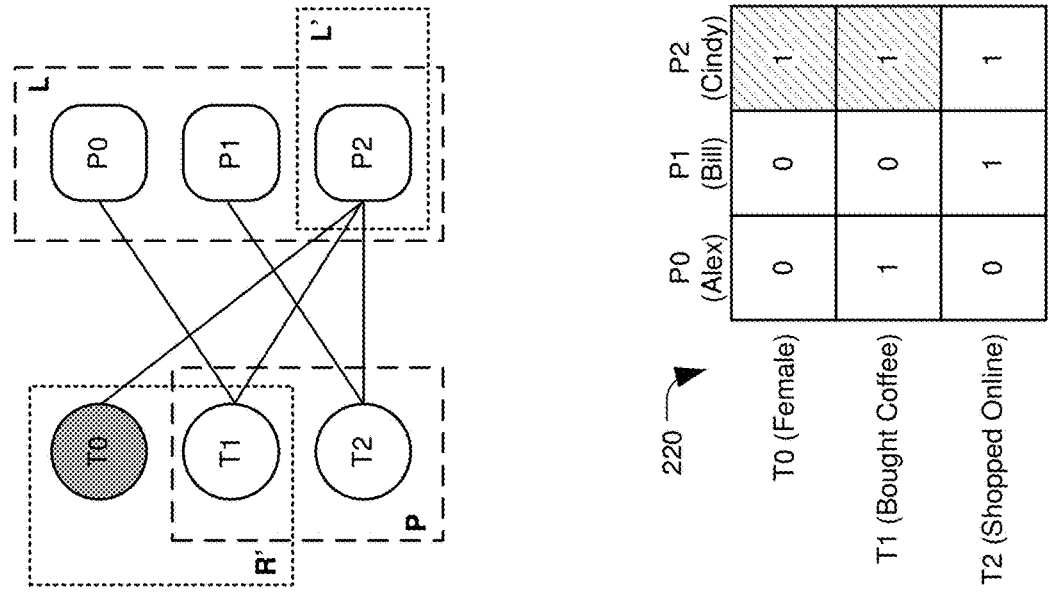

```
biclique_find(G, L, R, P, Q)
    //G is the Graph
    //E is the set of all edges in G
    While P ≠ {}
        P' = {}; Q'={};
        Select x from P
        P←P/{x} //remove x from P
        R'←R U {x} //add x to R'
        L'←{u ∈ L | (u,x) ∈ E(G)} //set L' to all nodes of L that are connected to x
        For all v ∈ Q
            If v is connected to all nodes in L'
                GoTo EXPANDQ //the biclique {L, R} is not maximal, and because R does
                               //not include v, no biclique based on v is maximal.
            Else If v is not connected to all nodes in L'
                Q'←Q' U {v}
        EndFor
        For all v ∈ P, v ≠ x
            If v connects to all nodes of L',
                R'←R U {v} //because v also connects to all nodes of L' (like x), add v to R'
            Else if v connects to at least one node of L'
                P'←P' U {v} //prepare for recursive call
        EndFor
        Output {L',R'} as a maximal biclique
        If P' ≠ {}
            biclique_find(G, L', R', P', Q') //recurse if P' is non-empty
        EXPANDQ: Q←Q U {x}
    EndWhile
```

FIG. 5

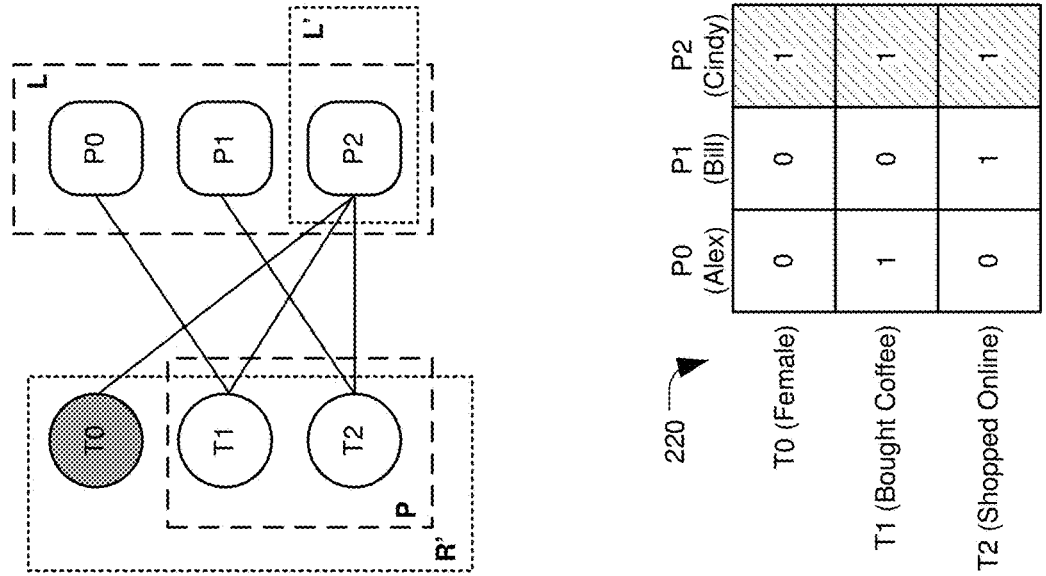

```
biclique_find(G, L, R, P, Q)
    //G is the Graph
    //E is the set of all edges in G
    While P ≠ {}
        P' = {}; Q'={};
        Select x from P
        P←P/{x} //remove x from P
        R←R U {x} //add x to R'
        L'←{u ∈ L | (u, x) ∈ E(G)} //set L' to all nodes of L that are connected to x
        For all v ∈ Q
            If v is connected to all nodes in L'
                GoTo EXPANDQ //the biclique {L, R} is not maximal, and because R does
                             //not include v, no biclique based on v is maximal.
            Else If v is not connected to all nodes in L'
                Q'←Q' U {v}
        EndFor
        /candidate biclique has been found, so iterate over P to confirm maximality
        For all v ∈ P, v ≠ x
            If v connects to all nodes of L',
                R'←R U {v} //because v also connects to all nodes of L' (like x), add v to R'
            Else if v connects to at least one node of L'
                P'←P' U {v} //prepare for recursive call
        EndFor
        Output {L',R'} as a maximal biclique
        If P' ≠ {}
            biclique_find(G, L', R', P', Q')  //recurse if P' is non-empty
        EXPANDQ: Q←Q U {x}
    EndWhile
```

FIG. 6

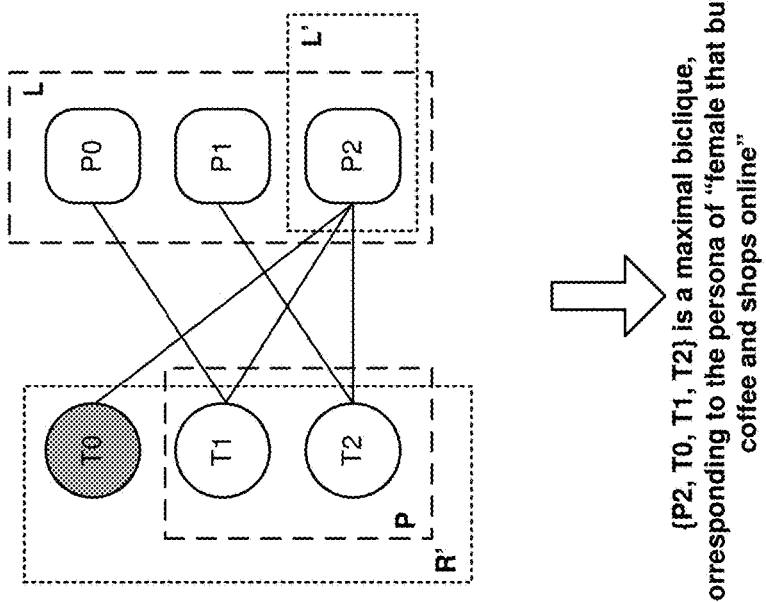

```
biclique_find(G, L, R, P, Q)
  //G is the Graph
  //E is the set of all edges in G
  While P ≠ {}
    P' = {}; Q'={};
    Select x from P
    P←P/{x} //remove x from P
    R'←R U {x} //add x to R'
    L'←{u ∈ L | (u, x) ∈ E(G)} //set L' to all nodes of L that are connected to x
    For all v ∈ Q
      If v is connected to all nodes in L'
        GoTo EXPANDQ //the biclique {L, R} is not maximal, and because R does
                     //not include v, no biclique based on v is maximal.
      Else If v is not connected to all nodes in L'
        Q'←Q' U {v}
    EndFor
    //candidate biclique has been found, so iterate over P to confirm maximality
    For all v ∈ P, v ≠ x
      If v connects to all nodes of L',
        R'←R U {v} //because v also connects to all nodes of L' (like x), add v to R'
      Else if v connects to at least one node of L'
        P'←P' U {v} //prepare for recursive call
    EndFor
    Output {L',R'} as a maximal biclique
    If P' ≠ {}
      biclique_find(G, L', R', P', Q') //recurse if P' is non-empty
    EXPANDQ: Q←Q U {x}
  EndWhile
```

{P2, T0, T1, T2} is a maximal biclique, corresponding to the persona of "female that buys coffee and shops online"

FIG. 7

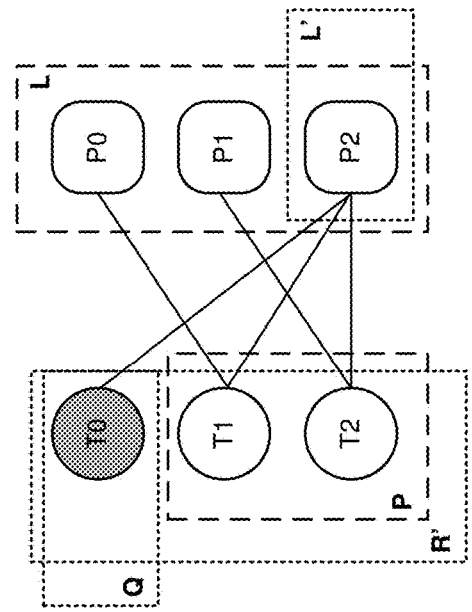

```
biclique_find(G, L, R, P, Q)
    //G is the Graph
    //E is the set of all edges in G
    While P ≠ {}
        P' = {}; Q'={};
        Select x from P
        P←P/{x} //remove x from P
        R'←R U {x} //add x to R'
        L'←{u ∈ L | (u, x) ∈ E(G)} //set L' to all nodes of L that are connected to x
        For all v ∈ Q
            If v is connected to all nodes in L'
                GoTo EXPANDQ //the biclique {L, R} is not maximal, and because R does
                             //not include v, no biclique based on v is maximal.
        Else If v is not connected to all nodes of L' (like x), add v to R'
            //candidate biclique has been found, so iterate over P to confirm maximality
        For all v ∈ P, v ≠ x
            If v connects to all nodes of L',
                R'←R U {v} //because v also connects to all nodes of L' (like x), add v to R'
            Else if v connects to at least one node of L'
                P'←P' U {v} //prepare for recursive call
        EndFor
        Output {L,R'} as a maximal biclique
        If P' ≠ {}
            biclique_find(G, L', R', P', Q') //recurse if P' is non-empty
        EXPANDQ: Q←Q U {x}
    EndWhile
```

*FIG. 8*

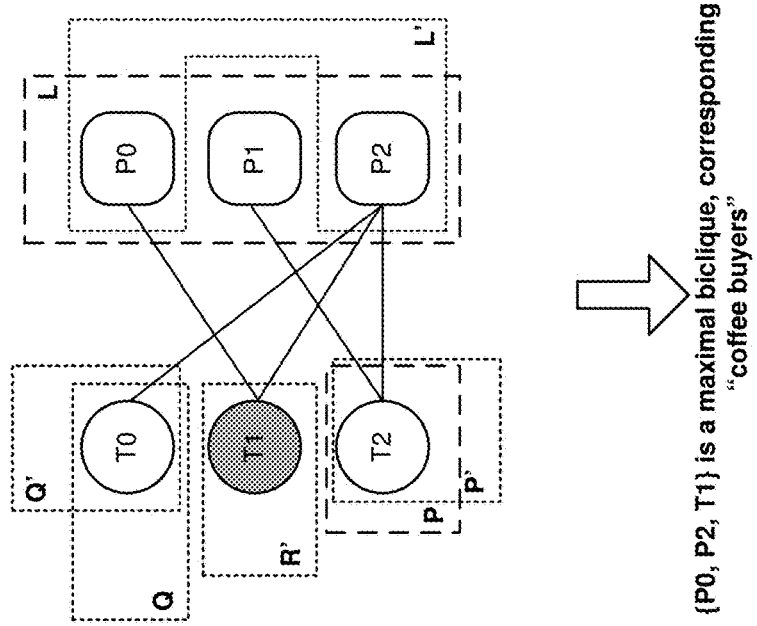

```
biclique_find(G, L, R, P, Q)
    //G is the Graph
    //E is the set of all edges in G
    While P ≠ {}
        P' = {}; Q'={};
        Select x from P
        P←P/{x} //remove x from P
        R'←R U {x} //add x to R'
        L'←{u ∈ L | (u, x) ∈ E(G)} //set L' to all nodes of L that are connected to x
        For all v ∈ Q
            If v is connected to all nodes in L'
                GoTo EXPANDQ //the biclique {L, R} is not maximal, and because R does
                             //not include v, no biclique based on v is maximal.
            Else If v is not connected to all nodes in L'
                Q'←Q' U {v}
        EndFor
        //candidate biclique has been found, so iterate over P to confirm maximality
        For all v ∈ P, v ≠ x
            If v connects to all nodes of L',
                R'←R U {v} //because v also connects to all nodes of L' (like x), add v to R'
            Else if v connects to at least one node of L'
                P'←P' U {v} //prepare for recursive call
        EndFor
        Output {L',R'} as a maximal biclique
        If P' ≠ {}
            biclique_find(G, L', R', P', Q') //recurse if P' is non-empty
        EXPANDQ: Q←Q U {x}
    EndWhile
```

{P0, P2, T1} is a maximal biclique, corresponding to "coffee buyers"

FIG. 12

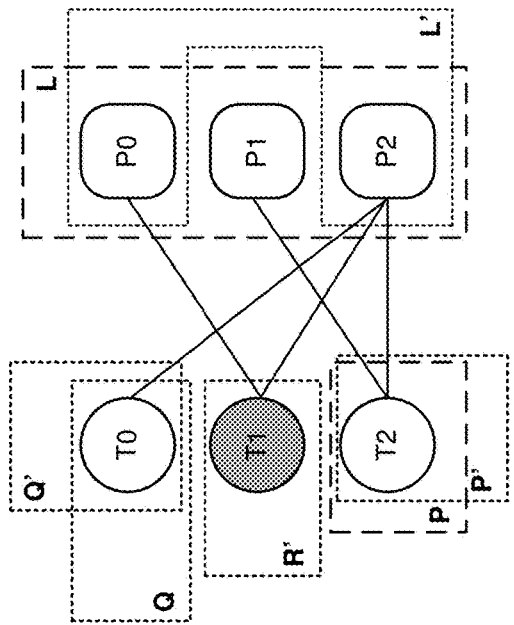

FIG. 13

```
biclique_find(G, L, R, P, Q)
    //G is the Graph
    //E is the set of all edges in G
    While P ≠ {}
        P' = {}; Q'={};
        Select x from P
        P←P/{x} //remove x from P
        R'←R U {x} //add x to R'
        L'←{u ∈ L | (u,x) ∈ E(G)} //set L' to all nodes of L that are connected to x
        For all v ∈ Q
            If v is connected to all nodes in L'
                GoTo EXPANDQ //the biclique {L, R} is not maximal, and because R does
                             //not include v, no biclique based on v is maximal.
            Else If v is not connected to all nodes in L'
                Q'←Q' U {v}
        EndFor
        //candidate biclique has been found, so iterate over P to confirm maximality
        For all v ∈ P, v ≠ x
            If v connects to all nodes of L',
                R'←R U {v} //because v also connects to all nodes of L' (like x), add v to R'
            Else if v connects to at least one node of L'
                P'←P' U {v} //prepare for recursive call
        EndFor
        Output {L',R'} as a maximal biclique
        If P' ≠ {}
            biclique_find(G, L', R', P', Q') //recurse if P' is non-empty
        EXPANDQ: Q←Q U {x}
    EndWhile
```

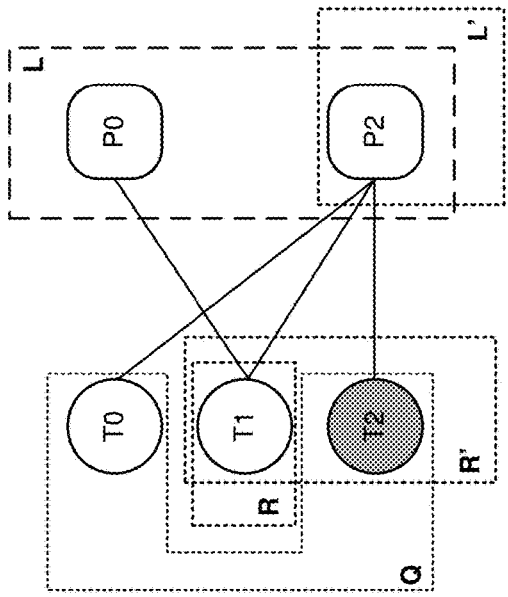

P is empty, so while loop in this recursive call ends, and the recursive call to biclique_find (from FIG. 13) terminates without finding additional maximal bicliques

```
biclique_find(G, L, R, P, Q)
    //G is the Graph
    //E is the set of all edges in G
    While P ≠ {}
        P' = {}; Q'={};
        Select x from P
        P←P/{x} //remove x from P
        R'←R U {x} //add x to R'
        L'←{u ∈ L | (u, x) ∈ E(G)} //set L' to all nodes of L that are connected to x
        For all v ∈ Q
            If v is connected to all nodes in L'
                GoTo EXPANDQ //the biclique {L, R} is not maximal, and because R does
                             //not include v, no biclique based on v is maximal.
            Else If v is not connected to all nodes in L'
                Q'←Q' U {v}
        EndFor
        //candidate biclique has been found, so iterate over P to confirm maximality
        For all v ∈ P, v ≠ x
            If v connects to all nodes of L',
                R'←R U {v} //because v also connects to all nodes of L' (like x), add v to R'
            Else if v connects to at least one node of L'
                P'←P' U {v} //prepare for recursive call
        EndFor
        Output {L',R'} as a maximal biclique
        If P' ≠ {}
            biclique_find(G, L', R', P', Q') //recurse if P' is non-empty
        EXPANDQ: Q←Q U {x}
    EndWhile
```

*FIG. 15*

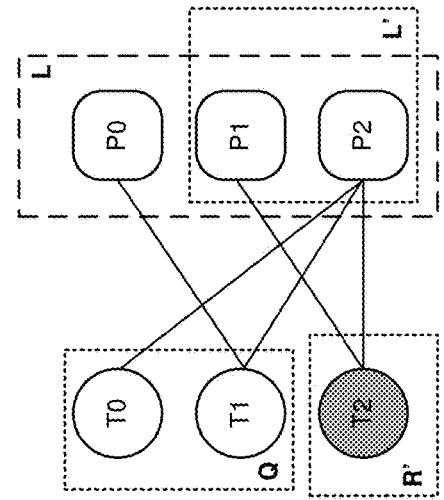

|  | P0 (Alex) | P1 (Bill) | P2 (Cindy) |
|---|---|---|---|
| T0 (Female) | 0 | 0 | 1 |
| T1 (Bought Coffee) | 1 | 0 | 1 |
| T2 (Shopped Online) | 0 | 1 | 1 |

220

```
biclique_find(G, L, R, P, Q)
  //G is the Graph
  //E is the set of all edges in G
  While P ≠ {}
    P' = {}; Q' = {};
    Select x from P
    P ← P/{x} //remove x from P
    R' ← R U {x} //add x to R'
    L' ← {u ∈ L | (u,x) ∈ E(G)} //set L' to all nodes of L that are connected to x
    For all v ∈ Q
      If v is connected to all nodes in L'
        GoTo EXPANDQ //the biclique {L, R} is not maximal, and because R does
                     //not include v, no biclique based on v is maximal.
      Else If v is not connected to all nodes in L'
        Q' ← Q' U {v}
    EndFor
    //candidate biclique has been found, so iterate over P to confirm maximality
    For all v ∈ P, v ≠ x
      If v connects to all nodes of L'
        R' ← R U {v} //because v also connects to all nodes of L' (like x), add v to R'
      Else if v connects to at least one node of L'
        P' ← P' U {v} //prepare for recursive call
    EndFor
    Output {L',R'} as a maximal biclique
    If P' ≠ {}
      biclique_find(G, L', R', P', Q')  //recurse if P' is non-empty
    EXPANDQ: Q ← Q U {x}
  EndWhile
```

FIG. 17

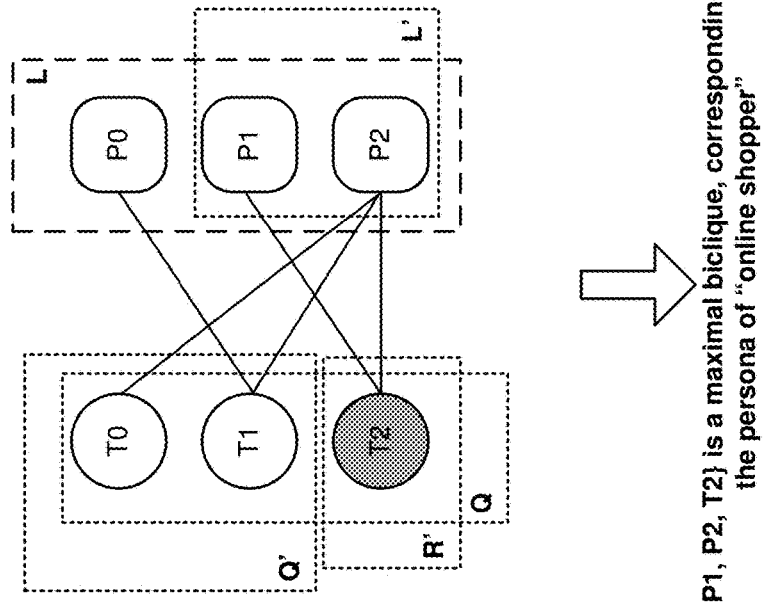

{P1, P2, T2} is a maximal biclique, corresponding to the persona of "online shopper"

FIG. 19

```
biclique_find(G, L, R, P, Q)
    //G is the Graph
    //E is the set of all edges in G
    While P ≠ {}
        P' = {}; Q' = {};
        Select x from P
        P←P/{x} //remove x from P
        R'←R U {x} //add x to R'
        L'←{u ∈ L | (u,x) ∈ E(G)} //set L' to all nodes of L that are connected to x
        For all v ∈ Q
            If v is connected to all nodes in L'
                GoTo EXPANDQ //the biclique {L, R} is not maximal, and because R does
                             //not include v, no biclique based on v is maximal.
            Else If v is not connected to all nodes in L'
                Q'←Q' U {v}
        EndFor
        //candidate biclique has been found, so iterate over P to confirm maximality
        For all v ∈ P, v ≠ x
            If v connects to all nodes of L',
                R'←R U {v} //because v also connects to all nodes of L' (like x), add v to R'
            Else if v connects to at least one node of L'
                P'←P' U {v} //prepare for recursive call
        EndFor
        Output {L',R'} as a maximal biclique
        If P' ≠ {}
            biclique_find(G, L', R', P', Q')  //recurse if P' is non-empty
        EXPANDQ: Q←Q U {x}
    EndWhile
```

FIG. 20

| | 0 | 1 | ... | Slice 1 2012 | ... | S-1 | ... | (X-1)*S | ... | Slice X 2014 | ... | Q | Bit String Totals |
|---|---|---|---|---|---|---|---|---|---|---|---|---|---|
| Male | 0 | 1 | ... | 0 | ... | 1 | ... | 1 | ... | 1 | ... | 1 | |
| Income [100-110k] | 1 | 1 | ... | 0 | ... | 0 | ... | 0 | ... | 0 | ... | 0 | 7 |
| Single | 0 | 1 | ... | 1 | ... | 1 | ... | 0 | ... | 1 | ... | 0 | 5 |
| Coffee Shop A | 0 | 1 | ... | 1 | ... | 0 | ... | 0 | ... | 0 | ... | 0 | |
| Store B | 0 | 1 | ... | 0 | ... | 1 | ... | 0 | ... | 0 | ... | 0 | 10 |
| Television Network C | 1 | 0 | ... | 1 | ... | 1 | ... | 1 | ... | 1 | ... | 1 | |
| Watches Video | 1 | 0 | ... | 1 | ... | 0 | ... | 0 | ... | 0 | ... | 0 | |
| Purchase | 0 | 1 | ... | 0 | ... | 1 | ... | 1 | ... | 1 | ... | 0 | |
| Reads Articles | 0 | 1 | ... | 0 | ... | 0 | ... | 1 | ... | 1 | ... | 1 | |

Bitmap Associated with Property 1

Query: Show me information related to men in my audience that like Coffee Shop A or have made a purchase Male ∩ (Coffee Shop A U Purchase)

| | | Slice 1 | | | | | | S-1 X*S | | | Slice X | | | | Q | Q+1 |
|---|---|---|---|---|---|---|---|---|---|---|---|---|---|---|---|---|
| Male | 0 | 1 | 1 | 0 | 1 | 1 | 1 | 1 | 1 | 1 | 1 | 1 | 1 | ... | 1 | 1 |
| Income [100-110k] | 1 | 0 | 0 | 1 | 0 | 0 | 0 | 1 | 0 | 0 | 0 | 1 | 0 | ... | 0 | 1 |
| Single | 0 | 1 | 0 | 1 | 1 | 0 | 1 | 0 | 1 | 1 | 0 | 0 | 1 | ... | 0 | 1 |
| Coffee Shop A | 0 | 1 | 0 | 1 | 1 | 0 | 0 | 0 | 1 | 1 | 0 | 0 | 1 | ... | 0 | 0 | 7
| Clothing Brand D | 0 | 0 | 0 | 1 | 0 | 1 | 0 | 1 | 0 | 1 | 0 | 0 | 0 | ... | 0 | 1 | 6
| Television Network C | 1 | 0 | 0 | 1 | 1 | 1 | 1 | 0 | 1 | 0 | 1 | 1 | 0 | ... | 1 | 1 |
| Watches Video | 1 | 0 | 0 | 0 | 0 | 0 | 0 | 1 | 0 | 1 | 0 | 0 | 1 | ... | 0 | 0 | 10
| Purchase | 0 | 1 | 1 | 0 | 1 | 0 | 0 | 0 | 1 | 0 | 1 | 1 | 0 | ... | 0 | 1 |
| Reads Articles | 0 | 1 | 0 | 1 | 0 | 0 | 1 | 1 | 0 | 0 | 1 | 1 | 1 | ... | 1 | 0 |
| Filter String | 0 | 1 | 0 | 0 | 1 | 0 | 0 | 0 | 1 | 0 | 1 | 1 | 0 | ... | 0 | 1 |

*FIG. 25*

SYSTEMS AND METHODS OF USING A BITMAP INDEX TO DETERMINE BICLIQUES

BACKGROUND

Computer networks, such as public networks (e.g., the Internet) and private networks (e.g., at medical institutions, financial institutions, business enterprises, etc.) have become a medium for research, communication, distribution, and storage of data. Consequently, more and more devices are network-enabled. To illustrate, on any given day, a typical user may access a half-dozen or more network-enabled devices, such as their mobile phone, tablet computer, home security system devices, one or more wearable devices, a home laptop or desktop, a work laptop or desktop, and home entertainment devices (e.g., televisions, game consoles, set top boxes, etc.). Moreover, Internet of Things (IoT) protocols enable network-enabled devices to communicate with each other without user intervention. Thus, there is an increasing amount of data being accessed, transferred, and stored online. As users use networks to access data, they also generate a large amount of data regarding themselves. On websites such as social networks, users actively and willingly share data regarding themselves. Identifying patterns in the data about users can be useful for analytics purposes, such as for informed marketing. However, identifying such patterns may be ineffective or impractical due to the sheer volume of data generated by computer network use.

SUMMARY

One way of representing data is to use a graph data structure. A graph data structure typically includes nodes that are connected by edges. For example, in a graph data structure corresponding to an Internet-based social network, nodes may represent users and edges may represent that two users are "friends" on the social network. Various data patterns can be identified in graph data structures. Examples of such data patterns include, but are not limited to, cliques, maximal cliques, bicliques, and maximal bicliques. A "clique" is a set of nodes in a graph such that each node of the clique is connected to each other node of the clique. To illustrate, in a social networking example, a clique may correspond to a set of users in which each user is friends with each other user. A "maximal clique" is a clique such that it is not possible to add another node and still have the resulting set of nodes set be a clique. Stated differently, a maximal clique is not part of any other clique. Thus, in the social networking example, for a maximal clique, there is no other user on the social network that is friends with every user of the clique (if there was, the clique would not be maximal).

Some graphs are bipartite graphs ("bigraphs"), in which the nodes can be divided into two distinct sets such that no node in one set is connected to any other node of that set. Stated another way, every edge of a bigraph connects a node from one set to a node in the other set. To illustrate, a bigraph may be used to represent player affiliations in a sports league: one set of nodes represents players, the other set of nodes represents teams, and edges represent that a player has played for a team. Bigraphs can have subsets of nodes and edges that are classified as "bicliques" (also known as complete bipartite graphs), in which each node from one set is connected to every node in the other set, and vice versa. Thus, a "maximal biclique" of a bigraph is a biclique such that it is not possible to add another node and have the result still be a biclique. Stated differently, a maximal biclique is a biclique that is not part of any other biclique.

Determining bicliques and maximal bicliques is a computationally expensive N-P hard problem to which there is no known polynomial time solution, due to how much larger the search space becomes when even a single additional node is added to either side of a bigraph. The United Nations has estimated that there are over three billion people that use the Internet. Thus, even if sufficient computing resources were available, determining the bicliques present in such a large data set would be very time intensive. The systems and methods of the present disclosure enable determining bicliques on large data sets by leveraging an in-memory (e.g., in random access memory (RAM)) bitmap index that represents the large data set, or at least a subset thereof, and by distributing computation across an arbitrary number of computing devices.

As an illustrative non-limiting example, a bitmap index may index data related to users that access a website. A system may track various characteristics of the users based on actions performed by the users on the web site, actions performed by the users on other websites, accessing the users' social networking profiles, etc. This "raw" data may be stored in a distributed storage network, and the bitmap index may include bit strings corresponding to the raw data (or a portion thereof). To illustrate, the bitmap index may include a bit string for the demographic property "Male" and a bit string for the demographic property "Age 21-25." The same position in each bit string may correspond to the same user. For example, if a particular user is assigned a user identifier (ID) of N, then the value of the $N^{th}$ bit of the "Male" bit string indicates whether the particular user is male and the value of the $N^{th}$ bit of the "Age 21-25" bit string indicates whether the particular user is between the ages of 21 and 25.

The bitmap index may enable real-time or near-real-time computation of various metrics or queries that combine logical set operations, such as AND, OR, and NOT operations. When the underlying data set is large, the bit strings of the bitmap index may be stored in distributed fashion across multiple storage nodes (e.g., servers having memory), and executing queries on the bitmap index may involve parallel computations on multiple storage nodes. As further described herein, an algorithm to identify bicliques (or maximal bicliques) may be reduced to queries that perform logical set operations on a bitmap index, and thus may be performed in a relatively short period of time even though the data set underlying the bitmap index is large.

In accordance with at last one described embodiment, a method includes receiving, at a computing device comprising a processor, a request to determine bicliques in a graph, where the graph includes a first set of nodes, a second set of nodes, and a set of edges, each edge in the set of edges connecting a node in the first set of nodes to a node in the second set of nodes. The method also includes computing at least one biclique based on querying a bitmap index representing the graph, where the bitmap index includes a plurality of bit strings corresponding to the first set of nodes, and where a value stored in a particular location in each bit string indicates whether an edge connects a first node corresponding to the bit string to a second node corresponding to the particular location.

Aspects of the present disclosure may include one or more of the following:

The bitmap index may represent data stored in a data store.

The data stored in the data store may be determined based on event signals received from devices associated with users that accessed a website.

The graph may include nodes corresponding to less than all of the users.

The graph may include nodes corresponding to a custom segment of the users.

The graph may correspond to top N signals associated with the website, where N is an integer greater than or equal to one.

The event signals may include at least one registration event signal.

One or more of the plurality of bit strings may correspond to a demographic attribute, a behavior, a brand affinity, or a combination thereof.

The bitmap index may be distributed across a plurality of storage nodes.

Each of the plurality of bit strings may be stored as one or more distributed slices, where at least a first slice of a particular bit string of the plurality of bit strings is stored in a different storage node than a second slice of the particular bit string.

Determining the at least one biclique may include adding a particular node from the first set of nodes to a third set of nodes, adding nodes of the second set of nodes that are connected to the particular node to a fourth set of nodes, in response to determining that another node of the first set of nodes is connected to each node in the fourth set of nodes, adding the other node to the third set of nodes, and outputting an indication that a combination of the third set of nodes and the fourth set of nodes corresponds to a maximal biclique of the graph.

Querying the bitmap may include generating a query execution plan for the query.

The query execution plan may identify one or more set operations, that one or more first storage nodes are to send stored portions of one or more bit strings to a second storage node, and that the second storage node is to perform the one or more set operations with respect to: the portions of the one or more bit strings received from the one or more first storage nodes and portions of one or more bit strings stored at the second storage node. The query execution plan may also identify that that the second storage node is to concatenate results of performing the one or more set operations to generate a result bit string that indicates a result of the query.

In another particular embodiment, an apparatus includes a processor and a memory storing instructions executable by the processor to perform operations including receiving an event signal, where the event signal includes information corresponding to a profile identifier associated with a user. The operations also include modifying a value of at least one bit stored in a bitmap index, where the bitmap index corresponds to a graph having a first set of nodes, a second set of nodes, and a set of edges. Each edge in the set of edges connects a node in the first set of nodes to a node in the second set of nodes. The bitmap index includes a plurality of bit strings corresponding to the first set of nodes, and a value stored in a particular location in each bit string indicates whether an edge connects a first node corresponding to the bit string to a second node corresponding to the particular location. The operations further include receiving a request to determine bicliques in the graph, where the request specifies a target segment of users. The operations include computing at least one biclique based on querying the bitmap index.

Aspects of the present disclosure may include one or more of the following:

The bitmap index may represent data stored in a data store.

The data stored in the data store may represent users that accessed a web site, where the target segment of users corresponds to fewer than all of the users that accessed the web site.

The bitmap index may be distributed across a plurality of storage nodes.

Each of the plurality of bit strings may be stored as one or more distributed slices, where at least a first slice of a particular bit string is stored in a different storage node than a second slice of the particular bit string.

In another particular embodiment, a computer readable storage device stores instructions that, when executed, cause a computer to perform operations including receiving, at a first storage node, a request to determine bicliques in a graph, where the graph includes a first set of nodes, a second set of nodes, and a set of edges, each edge in the set of edges connecting a node in the first set of nodes to a node in the second set of nodes. The operations also include identifying one or more portions of bit strings that are stored at the first storage node and that are associated with a bitmap index, where the bitmap index includes a plurality of bit strings corresponding to the first set of nodes, and where a value stored in a particular location in each bit string indicates whether an edge connects a first node corresponding to the bit string to a second node corresponding to the particular location. The operations further include determining, at the first node, at least a first biclique based on the one or more portions of bit strings that are stored at the first storage node. The operations include forwarding the request to at least a second storage node for determination of at least a second biclique, and receiving data identifying the second biclique from the second storage node. The operations also include outputting data identifying the first biclique and the data identifying the second biclique in response to the request.

Aspects of the present disclosure may include one or more of the following:

The bitmap index may generated by a measurement system, where the graph corresponds to at least one of: less than all users tracked by the measurement system, a custom segment of the users tracked by the measurement system, or top N signals associated tracked by the measurement system, where N is an integer greater than or equal to one.

BRIEF DESCRIPTION OF THE DRAWINGS

FIG. 2 is a diagram to illustrate a particular embodiment of the bitmap index of FIG. 1;

FIGS. 3, 4, 5, 6, 7, 8, 9, 10, 11, 12, 13, 14, 15, 16, 17, 18, and 19 are diagrams to illustrate steps involved in an exemplary method of using a bitmap index to determine bicliques;

FIG. 20 is a diagram to illustrate another particular embodiment of the bitmap index of FIG. 1;

Figure 24:
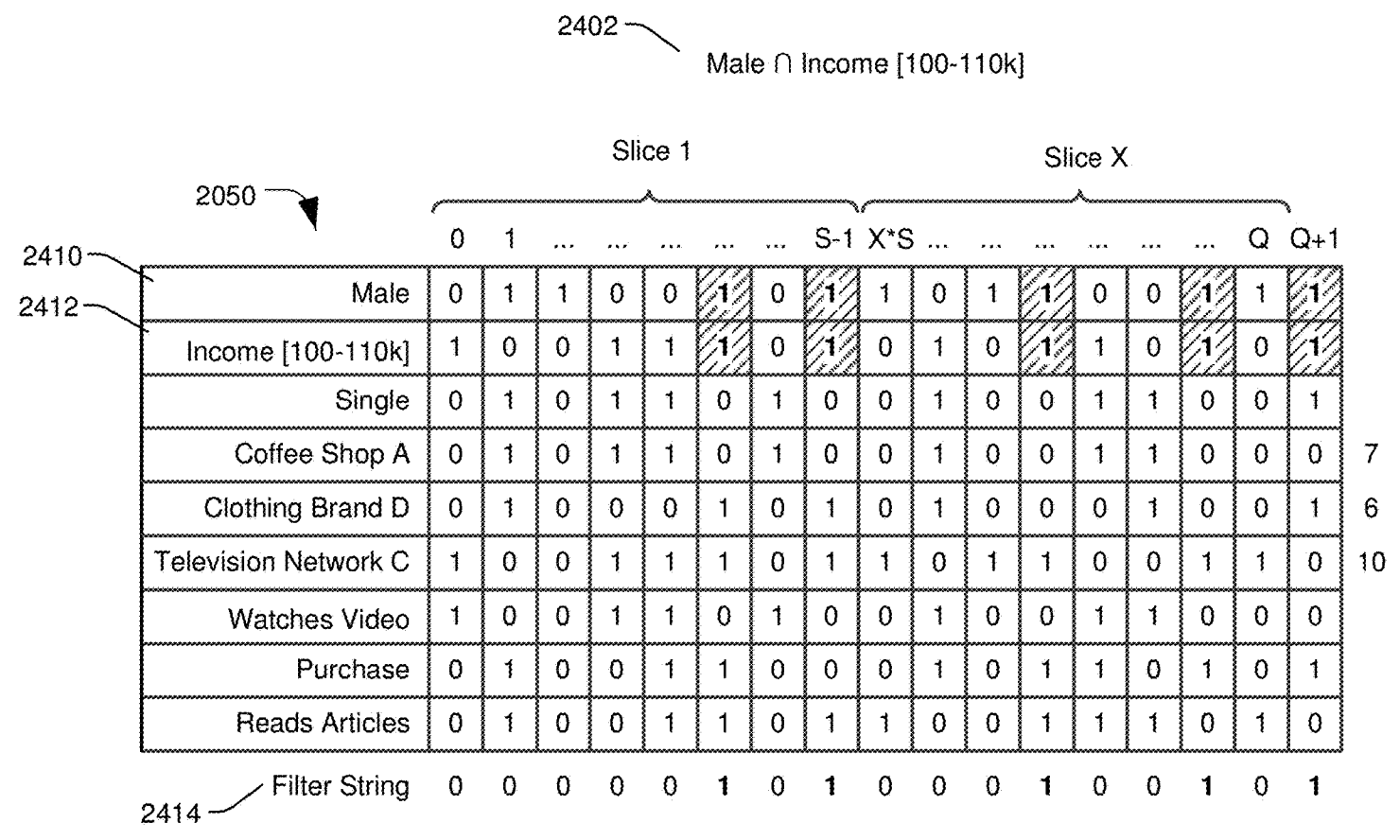

FIG. 24 is a diagram to illustrate a particular embodiment of a method of using a bitmap index during execution of a query;

FIG. 25 is a diagram to illustrate another particular embodiment of a method of using a bitmap index during execution of a query;

DETAILED DESCRIPTION

Figure 1:
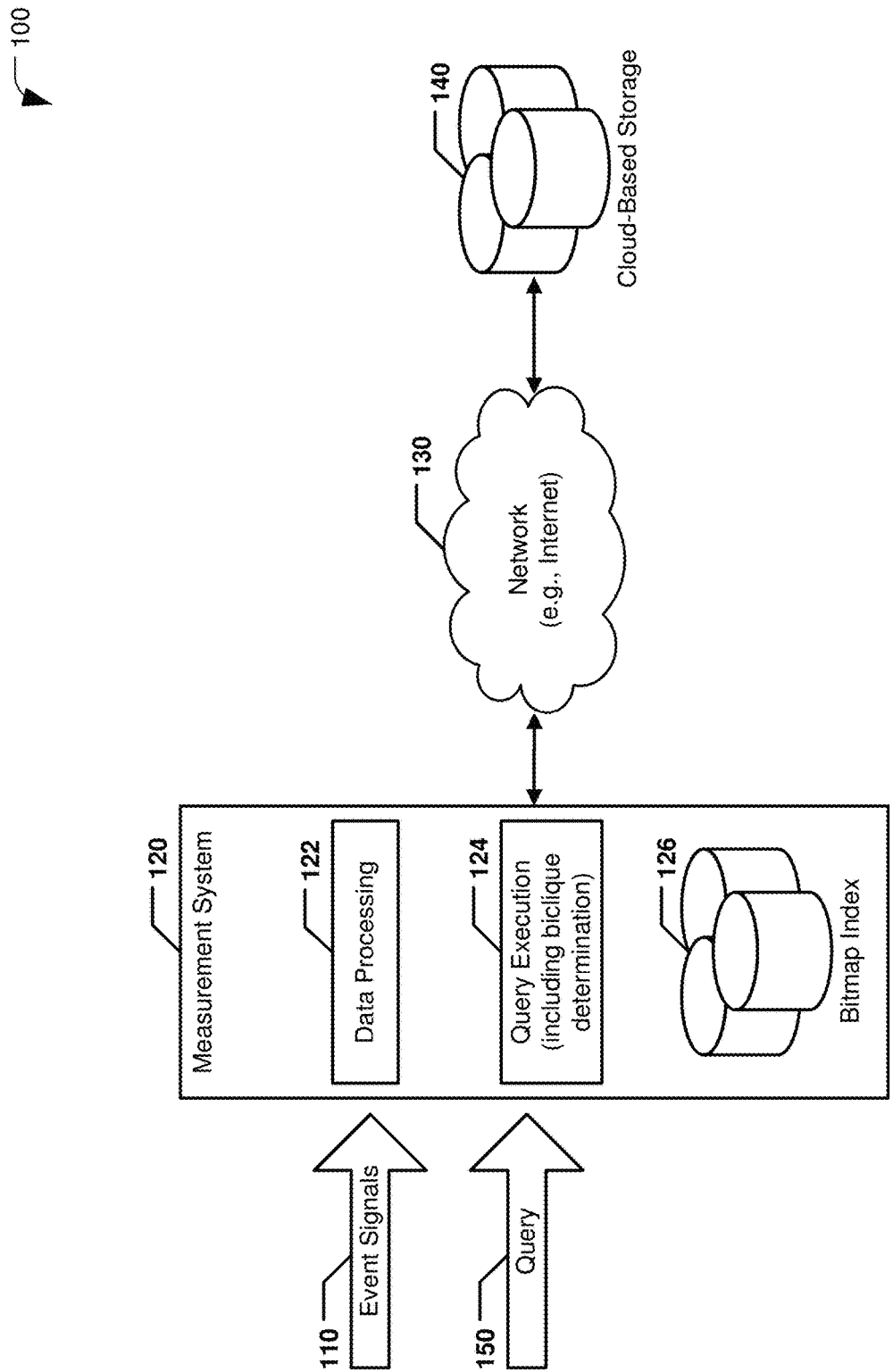
FIG. 1 is a diagram to illustrate a particular embodiment of a system that is operable to use a bitmap index to determine bicliques.

FIG. 1 illustrates a particular embodiment of a system 100 that is operable to generate and use a bitmap index. A measurement system 120 may be configured to receive event signals 110 associated with the audience of one or more media properties (e.g., websites). The event signals 110 may be received from sources that include, but are not limited to, computing devices, mobile devices, web servers, measurement logs, third-party data sources, and social networks. It is to be understood that although various embodiments may be described herein in the context of audience measurement for media properties (e.g., websites), the present disclosure is not limited as such. A bitmap index may be used to represent (and compute bicliques and maximal bicliques from) data collected in other scenarios, including but not limited to sensor data, data from various Internet of Things (IoT) devices, genomic data, financial data, etc. In some examples, a bitmap index may represent data that is unrelated to Internet use. For example, a bitmap index may be used to represent static data sets that are uploaded to the measurement system 120 offline, and may not correspond to data that was not captured/generated digitally, even though such data is represented digitally in the bitmap index. The systems and methods of the present disclosure may thus be agnostic as to the origin and type of data being represented by a bitmap index.

The measurement system 120 may be implemented using one or more computing devices (e.g., servers). For example, such computing devices may include one or more processors or processing logic, memories, and network interfaces. The memories may include instructions executable by the processors to perform various functions described herein. The network interfaces may include wired and/or wireless interfaces operable to enable communication to local area networks (LANs) and/or wide area networks (WANs), such as the Internet. In the illustrated example, the measurement system 120 is communicably coupled to a network 130.

The event signals 110 may include information associated with audience members of a media property. For example, when an audience member creates an account or otherwise registers with a media property using social networking identification, the measurement system 120 may retrieve event signals corresponding to data stored in social networking profiles of the audience member. As another example, the event signals 110 may identify specific interactions by the audience members with respect to the media property (e.g., what action was taken at a media property, when the action was taken, for how long the action was taken, etc.). The interactions may include interactions with advertisements presented by the media property and/or interactions with content presented by the media property. In a particular embodiment, each of the event signals 110 identifies a property (e.g., "Property 1") and an audience member (alternately referred to herein as a "user"). For example, if a user having a user ID=N made a purchase on the website for Property 1, a corresponding event signal received by the measurement system 120 may be "(userID=N, property=Property 1', behavior=Purchase)". In alternate embodiments, a different format may be used to represent an event signal.

The measurement system 120 may include a data processing module 122 and a query execution module 124, each of which may be implemented using instructions executable by one or more processors at the measurement system 120. The data processing module 122 may receive the event signals 110 and store "raw" data corresponding to the event signals 110 (e.g., a copy of the event signals 110) in cloud-based storage 140. The data processing module 122 may also store indexing data for the cloud-based storage 140 in a bitmap index 126. In a particular embodiment, unlike the cloud-based storage 140, the bitmap index 126 may be local (or more quickly accessible) to the measurement system 120. To illustrate, data for the bitmap index 126 may be stored across one or more data storage devices (e.g., nodes) that are part of the measurement system 120 or accessible to the measurement system 120 via a LAN, or other private high-speed network, as opposed to a WAN. Alternatively, or in addition, data of the bitmap index 126 may be stored "in-memory," such as in RAM. Thus, read and write operations with respect to the bitmap index 126 may be faster than corresponding read and write operations with respect to the cloud-based storage 140.

The measurement system 120 may maintain a bitmap index 126 for each media property being measured. Data in the bitmap index 126 may be stored in the form of bit strings. The bitmap index 126 may store bit strings corresponding to at least a subset of the data stored in the cloud-based storage 140. Thus, depending on implementation, the bitmap index 126 may, for a particular media property, include bit strings for all of the data stored in the cloud-based storage 140 or less than all of the data stored in the cloud based storage 140. In a particular embodiment, the bitmap index 126 for a particular media property includes, for each audience member of the media property, data regarding one or more attributes of the audience member, which may include but are not limited to demographic attributes, brand affinities, behaviors (e.g., interactions with the media property), etc.

To illustrate, a media property may have a known audience of one hundred thousand registered members. The bitmap index 126 for the media property may include bit strings representing various attributes associated with each of the hundred thousand audience members. Thus, each of the bit strings may be one hundred thousand bits in length. Further, the same location in each bit string may correspond to the same audience member. For example, if the $N^{th}$ location in a "Male" bit string has a value of "1" and the $N^{th}$ location in a "Watches video" bit string has a value of "1,"

this indicates that the N$^{th}$ audience member (who has a userID=N) is a male that has watched at least one video on the property.

In some examples, the bitmap index 126 for a media property may store bit strings corresponding to less than all of the data stored in the cloud-based storage 140. For example, although the cloud-based storage 140 may include "raw" data corresponding millions of signals/tiles, the bitmap index 126 may store bit strings for a smaller subset of the most signals/tiles (e.g., the top fifty thousand signals/tiles). In an alternative embodiment, the bitmap index 126 may store bit strings for all of the signals/tiles tracked in the cloud-based storage 140. Examples of the bitmap index 126 are further described herein. In a particular embodiment, the bitmap index 126 is automatically sorted based on a parameter, such as the total count of asserted bits in each bit strings, as an illustrative, non-limiting example.

The query execution module 124 may be configured to use the bitmap index 126 to execute queries regarding measurement data for a media property. For example, the query execution module 124 may receive a query 150 corresponding to the question "What are the top 50 tiles/signals for my audience?" In a particular embodiment, the query 150 may be generated using a query generation interface. If the bitmap index 126 is already sorted by the total number of asserted bits, the query execution module 124 may return data regarding the first fifty strings in the bitmap index 126.

Alternatively, if the bitmap index 126 is not sorted, the query execution module 124 may perform count operations on bit strings stored in the bitmap index 126. In a particular embodiment, because the bit strings may be stored across multiple nodes, the query execution module 124 may formulate a query execution plan that parallelizes execution of the query 150 across multiple nodes and minimizes the amount of data that is transferred between nodes during execution of the query 150. By executing the query 150 on bit strings stored in the bitmap index 126 in parallel without retrieving data from the cloud-based storage 140 and by reducing or minimizing data transfers, the query execution module 124 may achieve real-time or near-real-time performance. For example, the query execution module 124 may have a maximum query execution latency less than or equal to one hundred milliseconds. Further examples regarding query execution are described herein.

During operation, the measurement system 120 may receive the event signals 110 from various event sources. Each event signal may include a unique identifier, such as a user ID. If the user is a "new" audience member, the user may be assigned a new user ID and a user profile may be created for the user. Data for the user profile may be stored in the cloud-based storage 140 and/or the bitmap index 126. In a particular embodiment, data for the user profile may be retrieved from third party data sources, including but not limited to social networks. For example, the data may include, but is not limited to, demographic information associated with the user (e.g., a name, an age, a geographic location, a marital/family status, a homeowner status, etc.), social information associated with the user (e.g., social networking activity of the user, social networking friends/likes/interests of the user, etc.), and other types of data. The cloud-based storage 140 and the bitmap index 126 may be updated as additional event signals 110 are received (e.g., when additional users register with the media property, interact with the media property, etc.).

When the measurement system 120 receives the query 150, the query execution module 124 may execute the query 150 based on a query execution plan that parallelizes execution and reduces/minimizes the amount of bit string data that is transferred between nodes during execution of the query 150. The system 100 of FIG. 1 may thus enable audience measurement and analysis based on data (e.g., event signals) received from various sources. For example, event signals may be generated in response to user interactions with websites, web pages, audio items, video items, games, and/or text associated with various media properties. Further, the system 100 of FIG. 1 may enable real-time or near-real time execution of queries on the collected data. For example, the query execution module 124 may execute complex "top N" queries using the bitmap index 126 in real-time or near-real-time (e.g., within one hundred milliseconds).

In alternate embodiments, the described bitmap index may correspond to patients and the event signals 110 may identify a patient and may correspond to a healthcare event (e.g., a visit to a doctor's office, a prescription being filled, etc.). Bit strings of the bitmap index 126 may correspond to medical attributes, such as medical history, allergy information, medication taken, etc. The same location in each bit string may correspond to the same patient. As another example, a tracked "audience" may correspond to inventory or customers of a store. Bit strings of the bitmap index 126 may correspond to attributes of inventory, such as color, price, demand, etc., and/or attributes of customers. The same location in each bit string may correspond to the same inventory item or the same customer. As yet another example, in the financial industry, the same location in each bit string may correspond to the same investor, the same financial advisor, the same financial product, etc. As yet another example, bit strings of the bitmap index 126 may correspond to data output by devices in an IoT environment, and the same location of each bit string may correspond to the same device.

In some embodiments, data represented by the bitmap index 126 may correspond to a graph. For example, FIG. 2 illustrates an example of a bitmap index 220 corresponding to a graph 210. In the graph 210, a set of profiles P0, P1, and P2 (corresponding to users named Alex, Bill, and Cindy) are selectively connected to a set of tiles T0, T1, and T2 (corresponding to a user being female, a user having bought coffee, and a user having shopped online). A connection between nodes of the graph 210 corresponds to an asserted bit in the bitmap index 220. For example, because Bill and Cindy have shopped online, the bit string for T2 has a value of "1" for P1 and P2. Although a 3×3 bitmap index is illustrated for simplicity, it is to be understood that the techniques of the present disclosure may be used with bitmap indexes having an arbitrary number of rows (e.g., R, where R is an integer greater than or equal to one) and an arbitrary number of columns (e.g., C, where C is an integer greater than or equal to one).

Various data patterns can be identified in graph data structures. Examples of such data patterns include, but are not limited to, cliques, maximal cliques, bicliques, and maximal bicliques. A "clique" is a set of nodes in a graph such that each node of the clique is connected to each other node of the clique. A "maximal clique" is a clique such that it is not possible to add another node and still have the resulting set of nodes be a clique. Stated differently, a maximal clique is not part of any other clique. The graph 210 can be classified as a bipartite graph ("bigraph"), because nodes of the graph 210 can be divided into two distinct sets such that the no node in one set is connected to any other node of that set. That is, every edge of the graph 210 connects a node from one set to a node in the other set. Bigraphs can include subsets of nodes and edges that are classified as "bicliques" (also known as complete bipartite graphs), in which each node from one set is connected to every node in the other set, and vice versa. Thus, a "maximal biclique" of a bigraph is a biclique such that it is not possible to add another node and have the result still be a biclique. Stated differently, a maximal biclique is a biclique that is not part of any other biclique.

In some examples, the query execution module 124 of FIG. 1 may be configured to execute queries corresponding to logical operations that are performed when determining "quasi-maximal" bicliques (e.g., bicliques that are maximal, near-maximal, or sufficiently large to be of interest). When a bigraph links user profiles to attribute tiles, as in FIG. 2, determining bicliques or maximal bicliques can be useful to identify groups of seemingly unrelated users (profiles) that all share common attributes (tiles). For example, assume a bigraph represents ticket sales for a professional sports franchise during a calendar year. Nodes in one set of the bigraph may represent individual ticket purchasers, and nodes in the other set of the bigraph may represent attributes regarding ticket purchasers, such as age, payment method, estimated household income, whether the ticket was part of a season ticket package or an individual event ticket, average amount of money spent by the purchaser on concessions, whether the purchaser bought tickets as part of a group purchase, etc. Determining bicliques or maximal bicliques in the bigraph may enable the professional sports franchise to determine various "personas" of the ticket purchasing population. For example, a first maximal biclique identified in the bigraph may indicate that a large number of the ticket purchasers were season ticket holders that spent very little money on concessions. Based on this information, the sports franchise may conclude that season ticket holders were opting to dine elsewhere before or after events, and may diversity concession offerings in an effort to incite season ticket holders to spend more on food and beverages.

FIGS. 3-19 illustrate a particular example of an algorithm to determine maximal bicliques in the graph 210 based on the bitmap index 220. Pseudocode for the algorithm is shown on the left-hand side of FIGS. 3-19, with relevant lines of pseudocode on each figure highlighted using bold text. Additional details regarding a maximal biclique enumeration algorithm can be found in Zhang et al.: On finding bicliques in bipartite graphs: a novel algorithm and its application to the integration of diverse biological data types, BMC Bioinformatics 2014 15:110.

In FIG. 3, the algorithm begins with an initial call to a biclique_find procedure, which includes the parameters G, L, R, P, and Q. G is the graph 210 of FIG. 2, including all nodes and edges, L is initially the set of all profiles in the graph 210, R is initially empty, P is initially the set of all tiles in the graph 210, and Q is initially empty. Additional sets R', L', P', and Q' are initialized as empty. Generally, as the algorithm proceeds, R will contain a subset of P that includes candidate nodes for a maximal biclique, L will contain nodes connected to the nodes in R, and Q will contain examined candidate nodes. Thus, as the algorithm proceeds, R will generally grow while P and L generally shrink.

Figure 4:
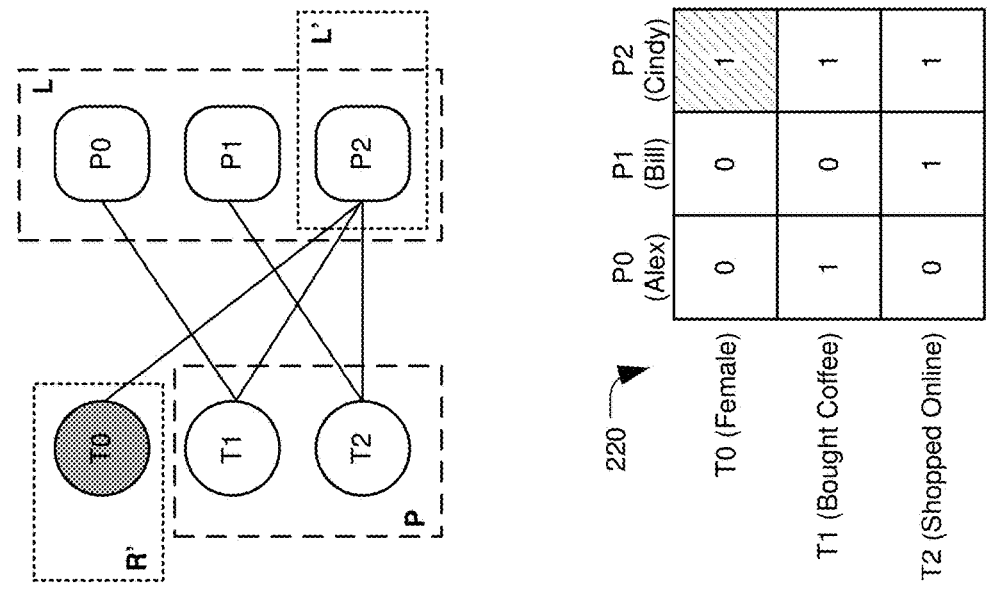

Continuing to FIG. 4, while P is not empty, a tile x is removed from P and added to the R', and profiles connected to the tiles in R' are moved from L to L'. In the illustrated example, x=T0 (shaded in gray on FIG. 4) is removed from P and added to R', leaving T1 and T2 in P. Further, because T0 is connected to P2, P2 is moved from L to L'. It will be appreciated that a query on the bitmap index 220 of FIG. 2 may be used to identify all profiles connected to a tile (e.g., by checking which bits have a value of "1" in the bit string corresponding to the tile). In the example of FIG. 4, the third bit of the bit string for T0 has a value of "1," and is marked using a hatch pattern for purposes of illustration.

Advancing to FIG. 5, the candidate biclique {L', R'} is checked for maximality by iterating over P. If any node in P connect to all nodes in L', then that node is added to R' (i.e., the candidate biclique is extended to include the node). To illustrate, in FIG. 5, T1 is added to R' because T1 connects to all of the nodes in L', i.e., to P2. Similarly, continuing to FIG. 6, T2 is added to R' because T2 connects to all of the nodes in L', i.e., to P2. In a particular embodiment, the bitmap index 220 may be used to determine whether a particular tile in P connects to all of the profiles in L'. In particular, a tile is connected to all of the profiles in L' when the bit string for the tile has a value of "1" at the bit positions corresponding to each of the profiles in L'. Thus, to iterate over P and check maximality, a profiles bit string may first be generated based on the profiles in L'. In the profiles bit string, the bit positions corresponding to each of the profiles in L' may have a value of "1". Then, a logical AND operation may be performed between the profiles bit string and the bit strings for each of the tiles in P. If the result of the logical AND operation is the same as the profiles bit string, then the tile had a value of "1" in for each of the profiles in L', and the corresponding tile is added to R'.

Advancing to FIG. 7, after the iteration over P to check maximality is completed, {L', R'} is output as a maximal biclique. In the example of FIG. 7, the computed maximal biclique is {P2, T0, T1, T2}, which corresponds to the persona of "female that buys coffee and shops online." Continuing to FIG. 8, Q is expanded to include x=T0, indicating T0 has been examined during a preceding iteration of the biclique_find procedure.

Figure 9:
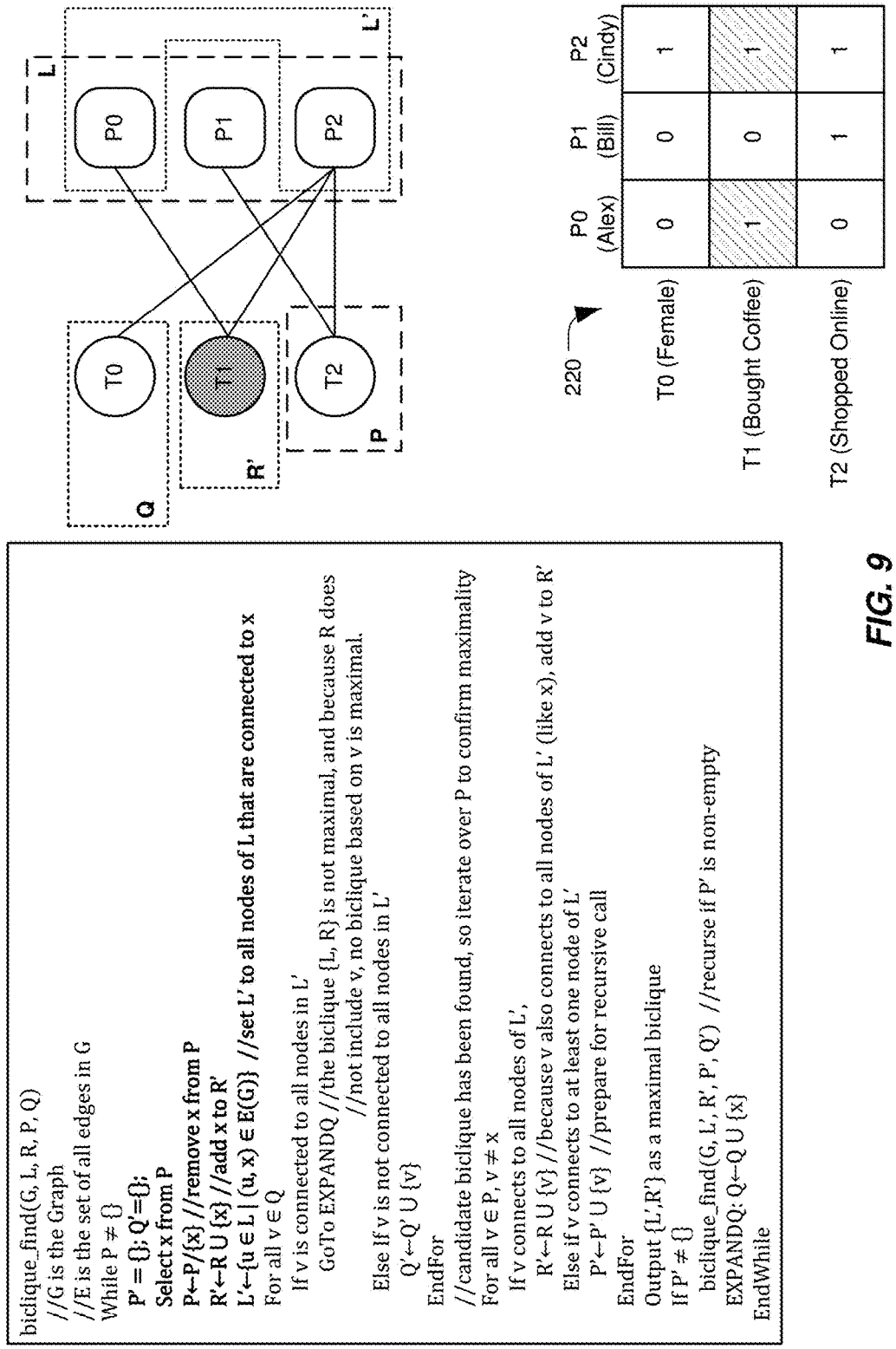

A second iteration of the main while loop of the biclique_find procedure begins in FIG. 9. During this second iteration, x=T1 is removed from P and added to R'. P0 and P2 are added to L' because they are connected to T1 by an edge. The fact that P0 and P2 are connected to T1 may be determined by querying on the bitmap index 220 of FIG. 2 to see which bit positions have a value of "1" in the bit string corresponding to tile T1.

Figure 10:
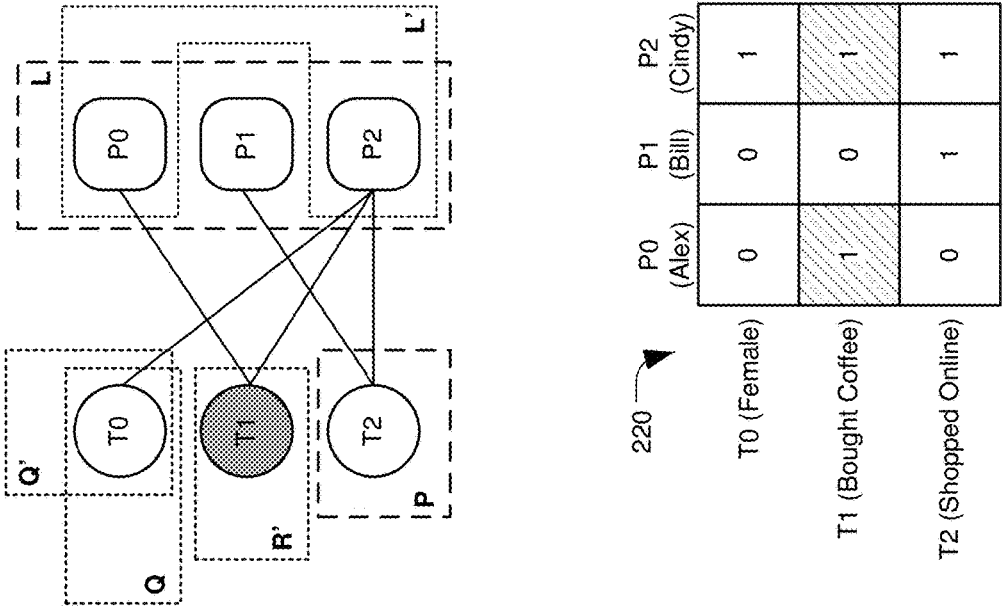

Progressing to FIG. 10, the nodes in Q are iterated over to determine whether the remaining algorithm steps for this value of x can be skipped because Q includes a node that is connected to all nodes in L'. When this condition is met, the biclique {L', R'} cannot be maximal. In the example of FIG. 10, the condition is not met, because T0 is not connected to P0. As a result, T0 is added to Q', as shown.

Figure 11:
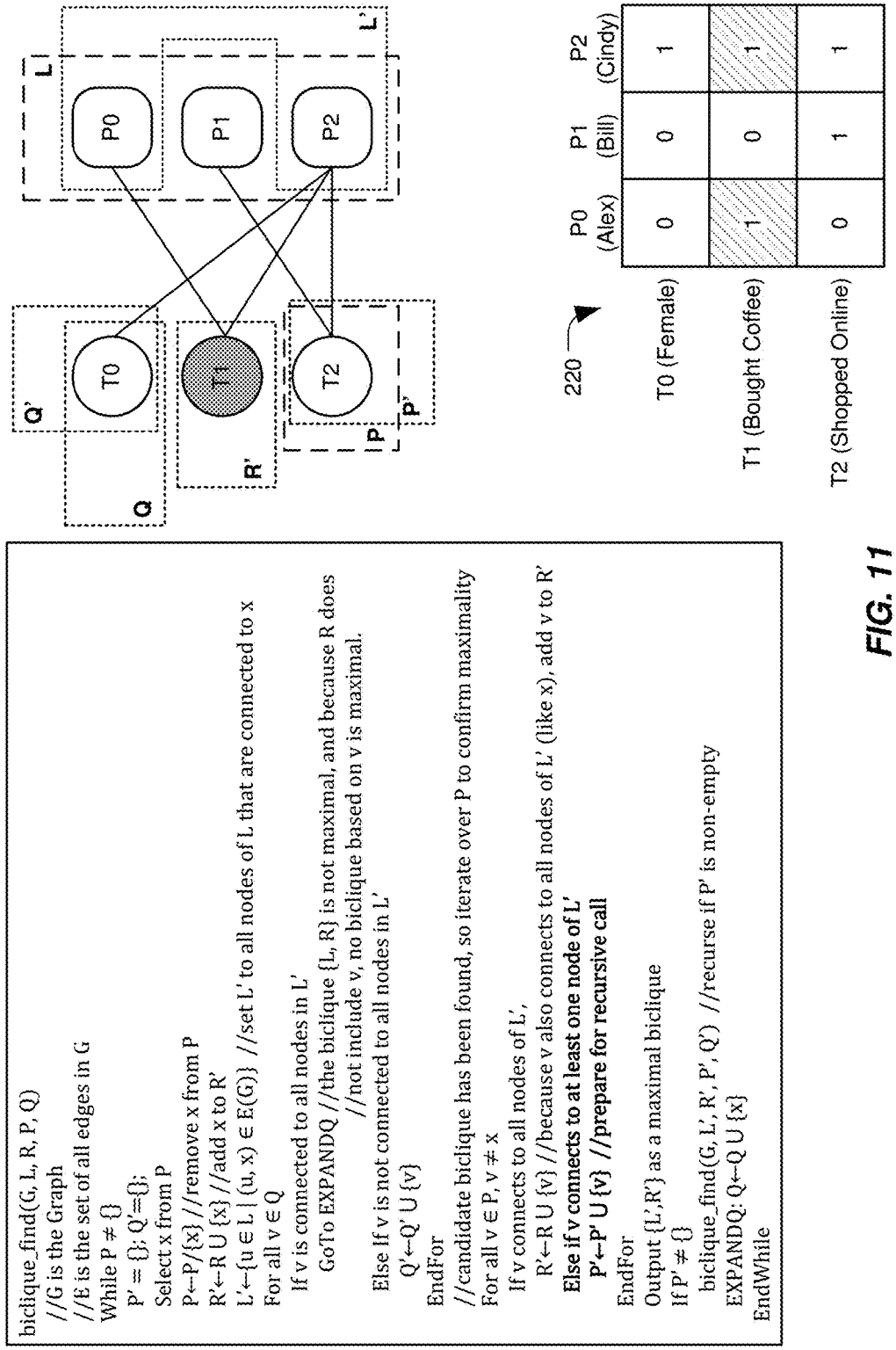

Advancing to FIG. 11, maximality is checked by iterating over P. Unlike FIG. 5 or 6, this time a node in P connects to fewer than all of the nodes in L'. In particular, T2 connects to P2 but not P0. As a result, T2 is added to the set P' in preparation for a recursive call to the biclique_find procedure.

Figure 14:
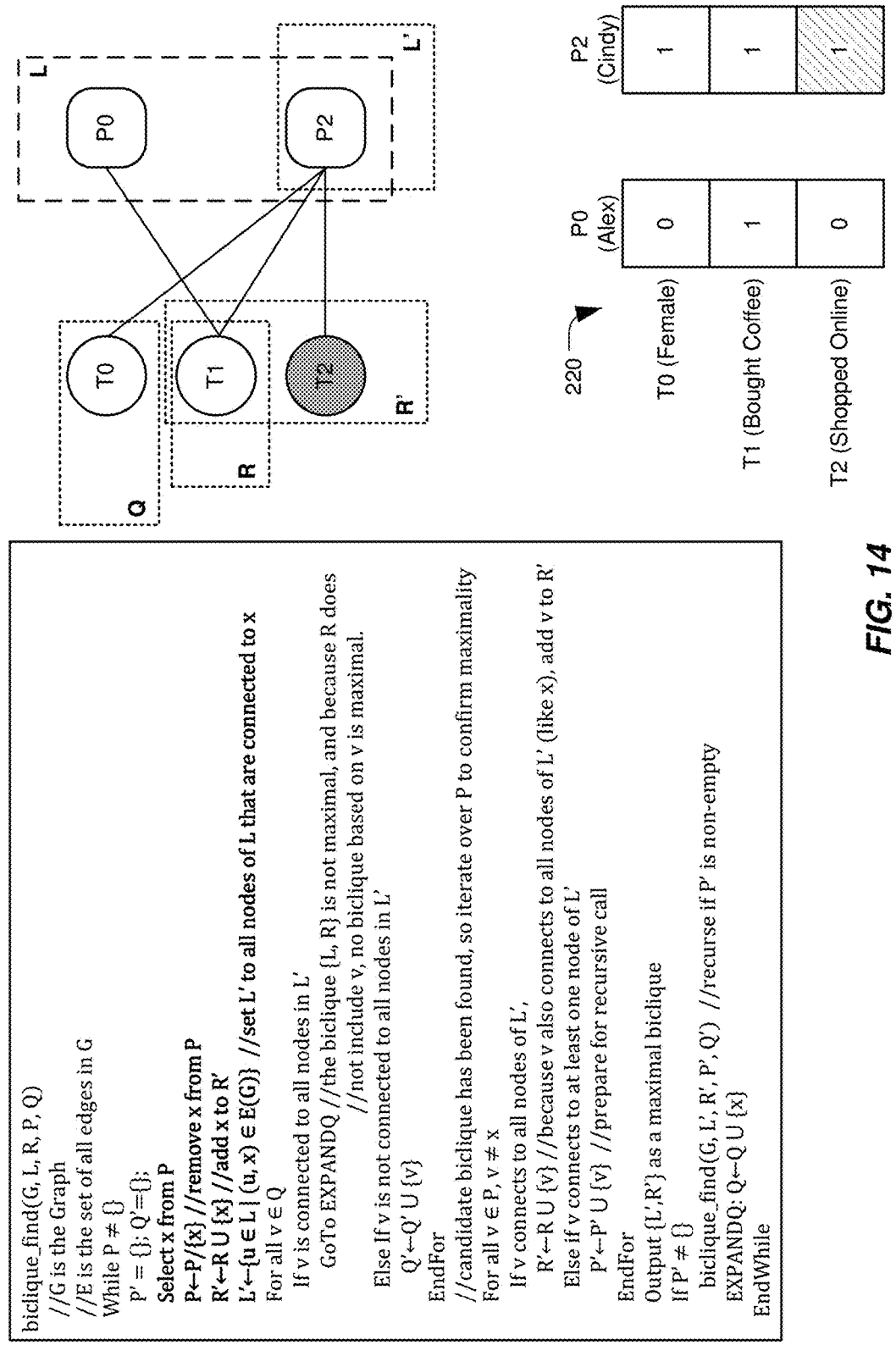

Continuing to FIG. 12, the maximal biclique {L', R'} is output. In this example, the maximal biclique {P0, P2, T1} corresponds to coffee buyers. Advancing to FIG. 13, the biclique_find procedure is recursively called using L', R', P', and Q' instead of L, R, P, and Q, respectively. To illustrate, as shown in FIG. 14, during the recursive call, the set L is initialized with the nodes of L' from FIG. 13, and therefore does not include P1. This is also graphically illustrated by hiding the column for P1 from the bitmap index 220 in FIG. 14. During the recursive call, the algorithm iterates over P. In the example of FIG. 14, x=T2 is removed from P (leaving P empty) and is added to R' (which already includes T1 due to the parameters passed during the recursive call). All nodes in L that are connected to T1 are added to L'. Thus, P2 is added to L'.

Advancing to FIG. 15, it is determined that a node in Q (i.e., T0) connects to all of the nodes in L' (i.e., P2). Therefore, the candidate maximal biclique {L', R' } cannot be maximal. The rest of the procedure is skipped and x=T2 is added to Q', as shown. In this case, because P is empty, the while loop ends and, thus, the recursive call to biclique_find initiated in FIG. 13 also ends.

Figure 16:
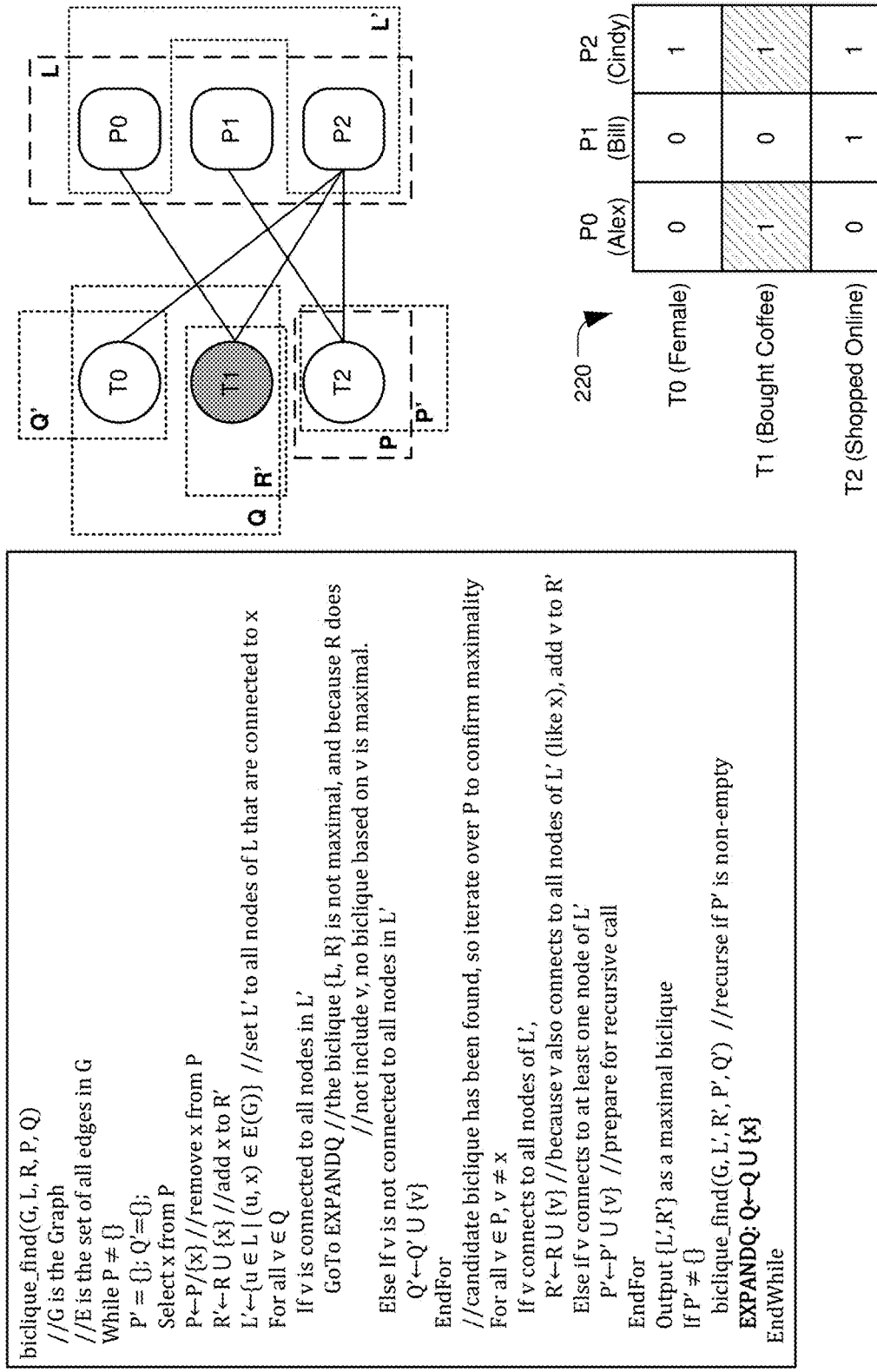
Figure 18:
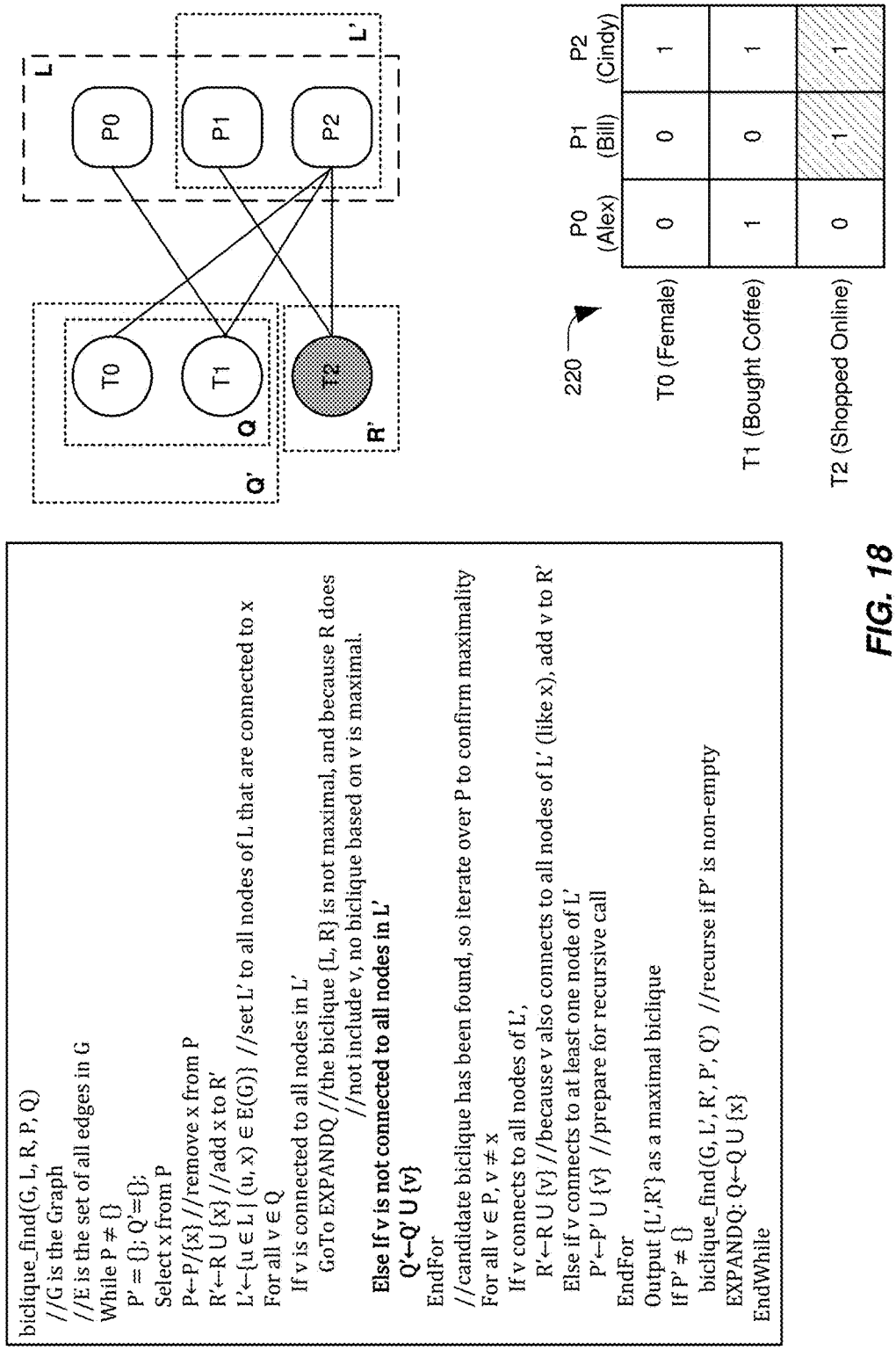

Returning from the recursive call, x=T1 is added to Q, as shown in FIG. 16. Continuing to FIG. 17, x=T2 is removed from P (leaving P empty) and is added to R'. All nodes connecting to T2 are added to L'. Thus, P1 and P2 are added to L'. Advancing to FIG. 18, T0 and T1 are added to Q', because T0 and T1 are connected to some but not all nodes in L'.

Continuing to FIG. 19, because P is empty, there is no need to iterate over P to check maximality of the candidate biclique {L, R,}. Thus, the biclique {P1, P2, T2} is output as a maximal biclique, corresponding to the persona of "online shopper." Q is expanded to include x=T2. Moreover, because P is empty, the biclique_find procedure terminates.

FIGS. 3-19 thus illustrate how to determine maximal bicliques in the graph 210 by performing operations on a bitmap index 220. As further described herein, such operations may be performed on a bitmap index quickly, even when the bitmap index or underlying data set is large.

Additional details regarding storing, updating, and querying a bitmap index are described with reference to FIGS. 20-27. Referring to FIG. 20, a particular embodiment of a bitmap index 2050 is shown. In an illustrative embodiment, the bitmap index 2050 is the bitmap index 126 of FIG. 1 or the bitmap index 220 of FIG. 2. The bitmap index 2050 may correspond to a particular media property tracked by the measurement system 120 of FIG. 1. The bitmap index 2050 stores a plurality of bit strings, which correspond to rows, or portions thereof, in the bitmap index 2050. Each bit string represents a "tile," which in the example of FIG. 20 correspond to demographic signals, brand affinity signals, and/or behavior signals exhibited by the audience members. For purposes of illustration, the bitmap index 2050 is shown as a grid, where each row 2004 of the bitmap index 2050 corresponds to a bit string. In FIG. 2, a bit string count is shown for the brand affinity bit strings. For example, the bit string for "Coffee Shop A" has a total of 7, indicating that 7 audience members have a brand affinity for "Coffee Shop A."

As described with reference to FIG. 1, the same location in each bit string may correspond to the same audience member (e.g., "profile" or user ID). Thus, each column 2002 of the bitmap index 2050 corresponds to a particular audience member. For example, a zero (0) at the intersection of the row 2004 and the column 2002 indicates that the user having a user ID equal to "Q" does not have an income in the range of $100,000-$110,000. It should be noted that the specific tiles shown in FIG. 2 for example only. Bit strings may be stored for more, fewer, and/or different tiles in alternative embodiments.

In a particular embodiment, each bit string in the bitmap index 2050 is subdivided into "slices" (e.g., sub-strings). In the illustrated example, each slice includes S bits, where S is a positive integer. Thus, a first slice 2012 of each bit string includes data related to audience members having IDs 0 to S−1. A last (e.g., $X^{th}$) slice 2014 includes data related to audience members having IDs (X−1)*S to Q. When bit strings are subdivided into slices, different slices of the same bit string may be stored in different locations (e.g., storage nodes). A hashing algorithm, such as consistent hashing, may be used (e.g., during read operations, write operations, query execution, etc.) to identify locations of the slices of a bit string. The value of S, which represents the maximum length of each slice, may be set based on a desired query execution latency. In a particular embodiment, S is equal to 65,535 (e.g., each slice includes $2^{16}$ bits).

Figure 21:
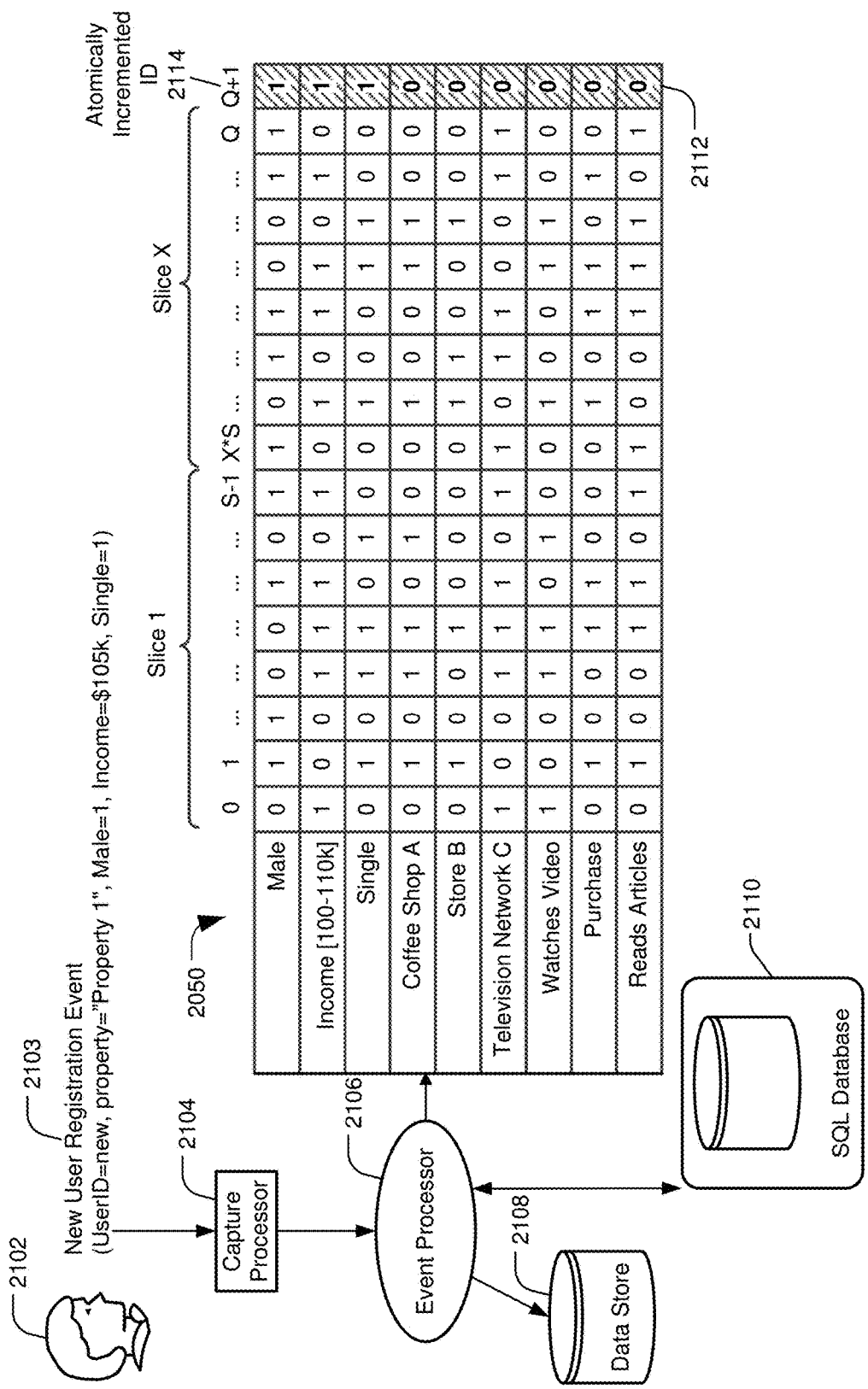
FIG. 21 is a diagram to illustrate a particular embodiment of a method of processing a registration event.

FIG. 21 illustrates an embodiment of adding a new user 2102 to the bitmap index 2050. In a particular embodiment, adding the new user 2102 to the bitmap index 2050 may involve a capture processor 2104, an event processor 2106, a data store 2108, and a database (e.g., an illustrative structured query language (SQL) database 2110). In an illustrative embodiment, the capture processor 2104 and the event processor 2106 correspond to the data processing module 122 of FIG. 1. The data store 2108 and/or the SQL database 2110 may correspond to the cloud-based storage 140 of FIG. 1.

During operation, the capture processor 2104 may receive an event signal corresponding to a new user registration event 2103 for the user 2102. The event signal indicates that the user 2102 is to be assigned a new user ID and is a new user for the media property "Property 1." The event signal also indicates (e.g., on the basis of retrieved social networking data and/or third-party data) that the user 2102 is a male, has an income of $105,000, and is single. In alternate embodiments, such demographic information may be automatically retrieved by a measurement system after the new user registration event, as further described herein.

The capture processor 2104 (which may implement a capture application programming interface (API)) may send the event signal to the event processor 2106. Because the user 2102 is a new audience member, the event processor 2106 may generate and assign a new user ID to the user 2102. For example, the event processor 2106 may atomically increment a largest previously assigned user ID (e.g., Q) to generate a new user ID 2114 (e.g., Q+1). In a particular embodiment, the event processor 2106 requests the new user ID 2114 from an atomic incrementer service (e.g., a web service). The event processor 2106 may then store data corresponding to the event signal in the data store 2108, the SQL database 2110, and/or the bitmap index 2050. For example, a new column 2112 may be created in the bitmap index by storing a new $(Q+1)^{th}$ bit in each of the bit strings in the bitmap index. When allocating and storing data in the $(Q+1)^{th}$ column involves creating a new slice, the event processor 2106 may automatically generate a new slice for each bit string of the bitmap index 2050. The value of the $(Q+1)^{th}$ bit in the "Male," "Income [100-110 k]," and "Single" bit strings may be set to "1" based on the event signal. The value of the $(Q+1)^{th}$ bit in the remaining bit strings may be zero (e.g., a default value).

Figure 22:
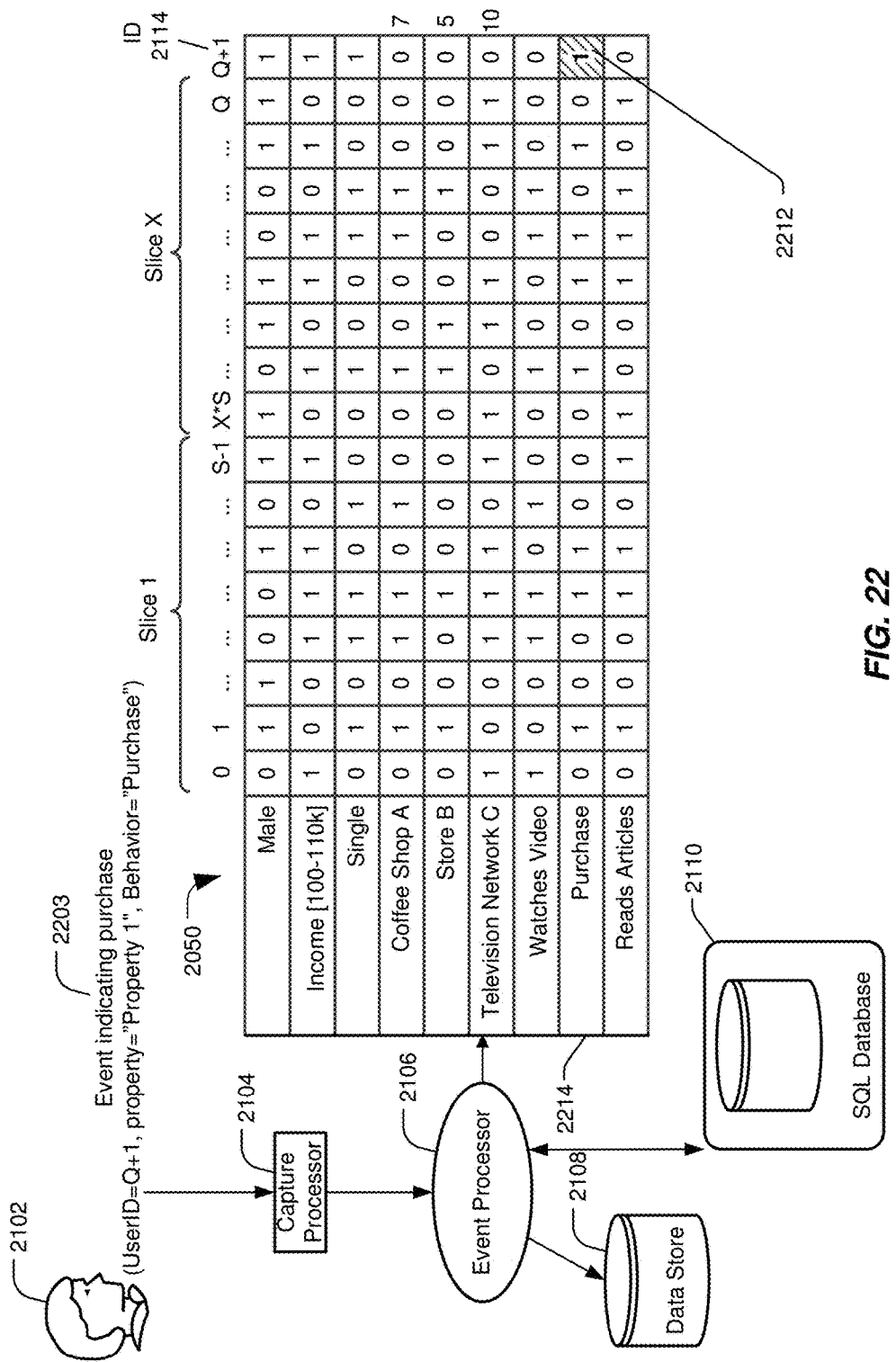
FIG. 22 is a diagram to illustrate a particular embodiment of a method of updating a bitmap index.

FIG. 22 illustrates a particular embodiment of updating the bitmap index 2050. During operation, the capture processor 2104 may receive an event signal 2203 corresponding to updated information for the user 2102. In the illustrated example, the event signal 2203 is generated based on the user 2102 making a purchase on the media property. The event processor 2106 may receive the event signal 2203 and determine which row(s) and column(s) of the bitmap index 2050 are affected by the event signal 2203. In the illustrated example, the event processor 2106 determines that the event signal 2203 will cause the value of the $(Q+1)^{th}$ bit 2212 of a "Purchase" bit string 2214 to be set to "1." The event processor 2106 may also update the data store 2108 and/or the SQL database 2110 based on the received event signal 2203.

Figure 23:
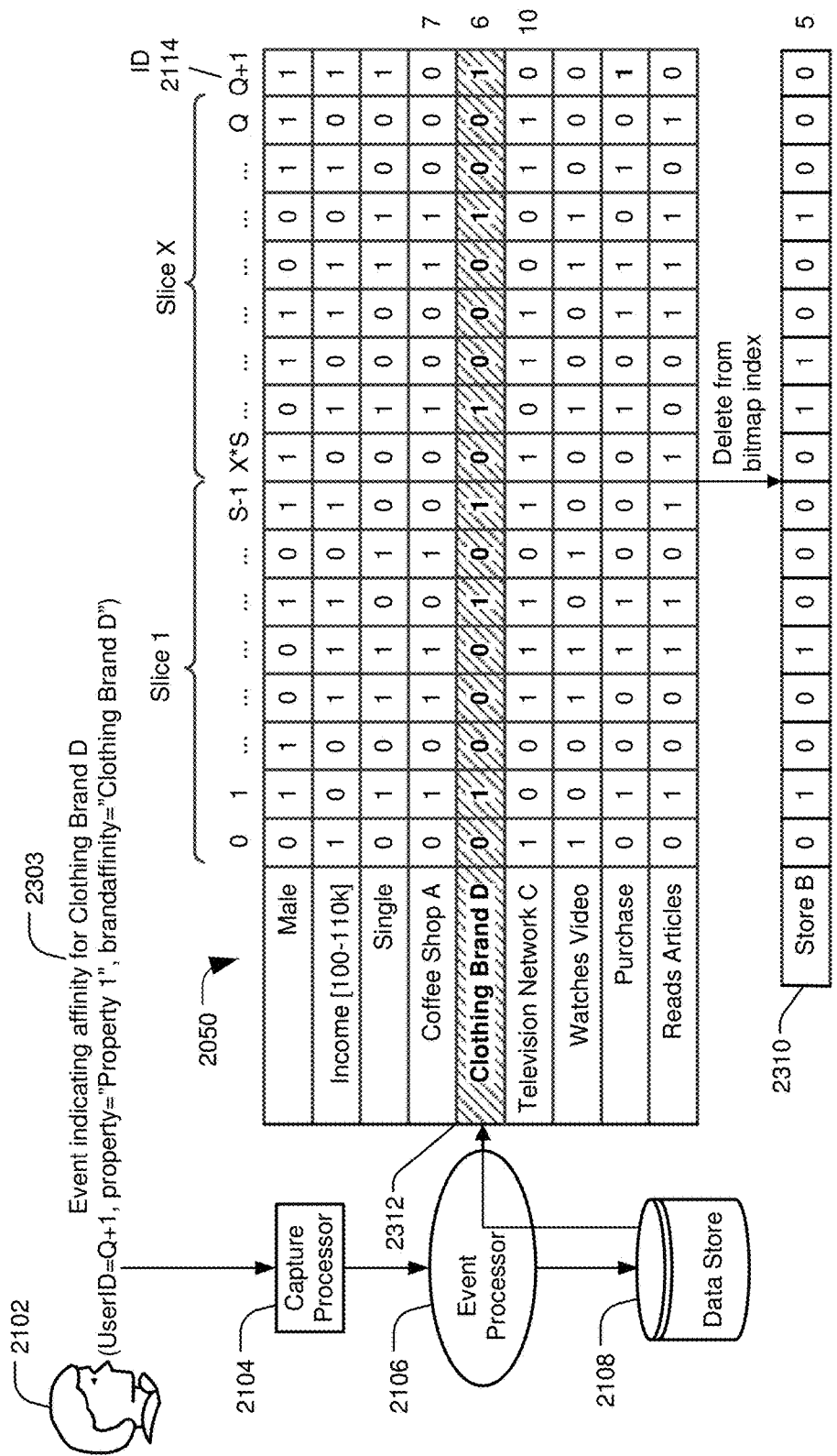
FIG. 23 is a diagram to illustrate another particular embodiment of a method of updating a bitmap index.

As described with reference to FIG. 1, in some embodiments, the bitmap index 2050 includes bit strings for fewer than all of the attributes/tiles being tracked. For example, although all demographic and/or behavioral tiles may be stored in the bitmap index 2050, bit strings for only the top N brands may be included in the bitmap index 2050, where N is an integer greater than or equal to one. In such embodiments, a received event signal may cause a particular tile to become elevated into or fall out of the top N tiles. FIG. 23 illustrates a particular embodiment of updating the bitmap index 2050 responsive to an event signal.

For ease of illustration, the bitmap index 2050 is depicted as storing three brand affinity bit strings (i.e., N=3). Initially, the three brands may be "Coffee Shop A," "Store B," and "Television Network C." The brand affinity counts for the three brands are 7, 5, and 10 audience members, respectively. Brand affinity data for additional brands (e.g., brands outside the top N brands) may be stored in the data store 2108.

A received event signal 2303 may indicate that the user 2102 has an affinity for "Clothing brand D." Upon receiving the event signal 2303, the event processor 2106 may determine that a brand affinity bit string for "Clothing Brand D" is not stored in the bitmap index 2050. Thus, the event processor 2106 may store data for the event signal 2203 in the data store 2108. The event processor 2106 (or a background process or thread) may determine that because of the event signal 2303, "Store B" (which has a count of 5) has fallen outside of the top N brands and that "Clothing Brand D" (which now has a count of 6) has become elevated into the top N brands. In response to the determination, a bit string 2310 for "Store B" may be replaced in the bitmap index 2050 with a bit string 2312 for "Clothing Brand D."

FIG. 6 illustrates a particular embodiment of executing (e.g., resolving) a query 2402 using the bitmap index 2050. The query 2402 may be received and executed by the query execution module 124 of FIG. 1. The result of executing the query 2402 is another bit string 2414, referred to herein as a "filter string." In the illustrated example, the query 2402 corresponds to an intersection (logical AND) operation between the "Male" and "Income [100-110 k]" demographic properties (i.e., corresponds to the question "Which of my audience members is male and has a household income between $100,000 and $110,000?"). Thus, the filter string 2414 may correspond to a custom segment of an audience of a particular property that is associated with the bitmap index 2050. The custom audience segment may correspond to an aggregation of audience segments generated using one or more set operations, such as logical AND operations and logical OR operations.

Resolving the query 2402 may include ANDing each bit string location (i.e., each user) of a "Male" bit string 2410 with a corresponding location of an "Income [$100-110 k] bit string 2412, as shown. When both corresponding locations contain a "1," the corresponding location of the filter string 2414 is set to 1. At the conclusion of the AND operations, the filter string 2414 corresponds to a custom audience segment of men who earn $100,000-$110,000.

In a particular embodiment, the filter string 2414 is stored and available for use during execution of subsequent queries. The filter string 2414 may also be used to query the data store 2108 (e.g., cloud-based storage) or the SQL database 2110 (e.g., a user profile database) regarding the custom audience segment. It should be noted that while the illustrated query 2402 calls for a single set operation to generate the filter string 2414, the described techniques may be used with more complex queries that involve any number of union operations, intersection operations, and/or count operations. For example, FIG. 25 illustrates a particular embodiment of resolving a (more complex) second query 2502 to generate a second filter string 2516. In FIG. 25, the query 2502 is a top Z brand affinities query (where Z is a positive integer).

The query 2502 requests identification of audience members that are male and that like "Coffee Shop A" or have made a purchase on the media property. The filter string 2516 may be generated by ORing a "Coffee Shop A" bit string 2512 with a "Purchase" bit string 2514 to generate an intermediate result string (not shown). The filter string 2516 may be generated by ANDing the "Male" bit string 2410 with the intermediate result string. The audience members having a "1" in the filter string 2516 represent the audience members who are male and either have a brand affinity for "Coffee Shop A" or have made a purchase. In a particular embodiment, the filter string 2516 may be stored and used during execution of subsequent queries. For example, to answer the question "What are the top 50 brands for men in my audience that either have an affinity for Coffee Shop A or have made a purchase?" the filter string 2516 may be generated. The filter string 2516 may be ANDed with each of the brand affinity bit strings to generate result strings. Count operations may be performed on the result strings and the 50 brand affinities with the highest counts may be returned in response to the question.

It will be appreciated that during query execution, the AND/OR operations performed on bit strings are performed one bit at a time, and the result of an operation on any single bit location does not impact the result of the operation on any other bit location. Thus, query execution may be parallelized. For example, when slices of the bit strings are stored at different network nodes, performing an operation with respect to bit strings may be parallelized into performing the operation with respect to individual slices at individual nodes. To determine where and in what order such parallel operations should be performed, a query execution module may generate a query execution plan.

Figure 26:
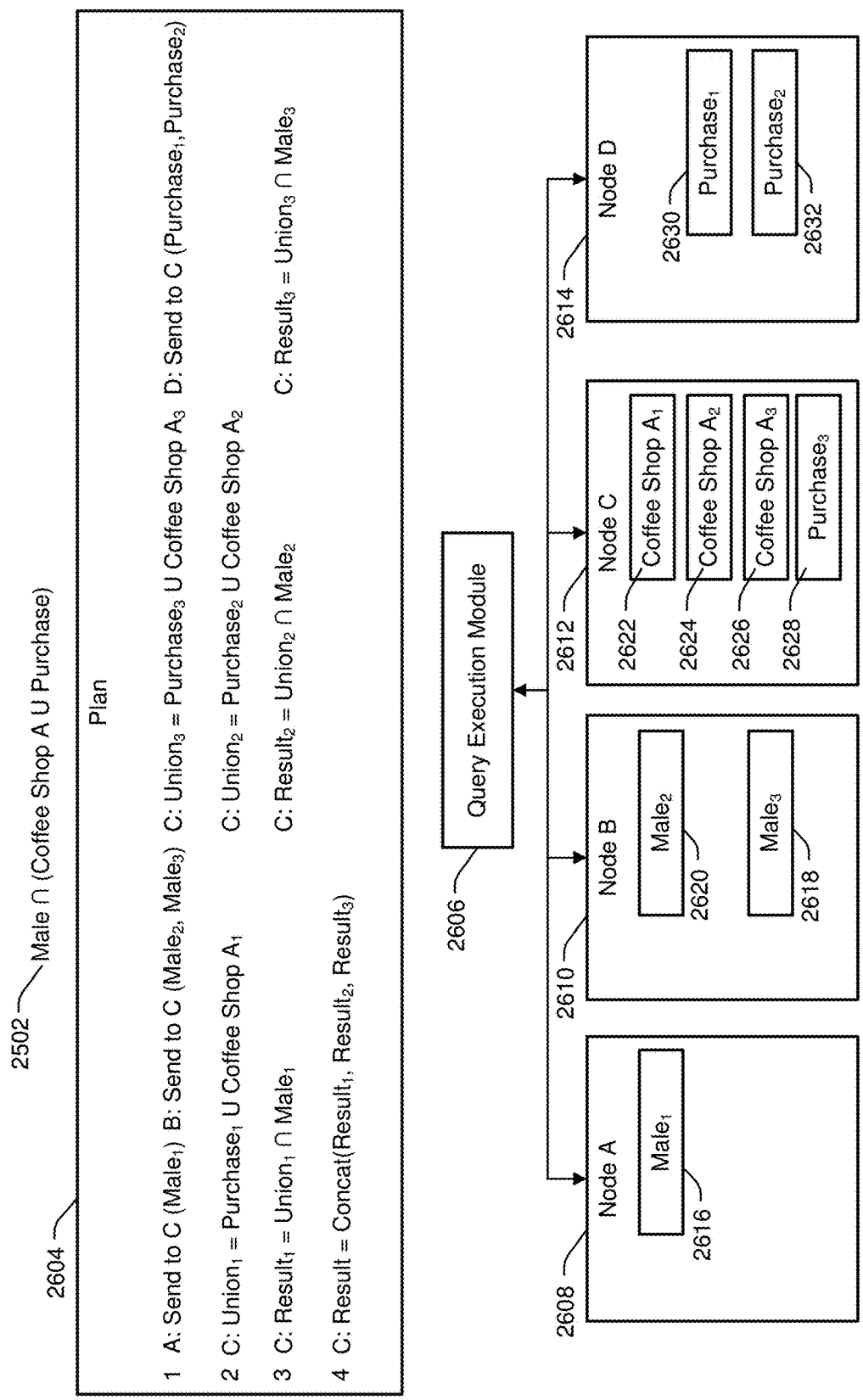
FIG. 26 is a diagram to illustrate a particular embodiment of a method of generating a query execution plan corresponding to the query of FIG. 25.

For example, FIG. 26 illustrates a particular embodiment of generating of a query execution plan 2604 to resolve the query 2502 of FIG. 25. Upon receiving the query 2502, a query execution module 2606 may generate a query execution plan 2604. In a particular embodiment, because data transfers between nodes may represent a bottleneck, the query execution plan 2604 may be generated such that data transfers are reduced/minimized. In a particular embodiment, the query execution module 2606 is part of one of the nodes 2608-2614. Alternately, the query execution module 2606 may be part of a separate node (e.g., a load-balancing node).

For example, the query execution module 2606 may determine that resolution of the query 2502 of FIG. 25 involves performing operations on the "Male" bit string, the "Coffee Shop A" bit string, and the "Purchase" bit string. In the illustrated example, each of the bit strings has three slices. A first slice 2616 of the "Male" bit string, designated $Male_1$ is stored on Node A 2608. A $Male_2$ slice 2618 and a $Male_3$ slice 2620 are stored on Node B 2610. Coffee Shop $A_1$, Coffee Shop $A_2$, Coffee Shop $A_3$, and $Purchase_3$ slices 2622, 2624, 2626, and 2628 are stored on Node C 2612. Purchase' and $Purchase_2$ slices 2630 and 2632 are stored on Node D 2614.

The query execution plan 2604 identifies operations and at what nodes are to perform the operations. For example, the query execution plan 2604 indicates that in a first step, Node C 2612 is to perform a union (OR) operation between Coffee Shop $A_3$ slice 2626 and the Purchase$_3$ slice 2628 to generate an intermediate result slice Union$_3$. In parallel, Node A 2608 is to transfer a copy of the Male$_1$ slice 2616 to Node C 2612 and Node B 2610 is to transfer copies of the Male$_2$ slice 2618 and the Male$_3$ slice 2620 to Node C 2612. Node D is to transfer copies of the Purchase' slice 2630 and the Purchase$_2$ slice 2632 to Node C 2612.

In a second step, Node C 2612 performs two operations in parallel: ORing the Purchase$_1$ slice 2630 and the Coffee Shop $A_1$ slice 2622 to generate an intermediate result slice Union$_1$, and ORing the Purchase$_2$ slice 2632 and the Coffee Shop $A_2$ slice 2624 to generate an intermediate result slice Union$_2$.

In a third step, Node C 2612 performs three operations in parallel to generate three intermediate bit strings. The first intermediate bit string Result$_1$ is generated by ANDing the Union$_1$ slice with the Male$_1$ slice. The second intermediate bit string Result$_2$ is generated by ANDing the Union$_2$ slice with the Male$_2$ slice. The third intermediate bit string Result$_3$ is generated by ANDing the Union$_3$ slice with the Male$_3$ slice. In a fourth step, Node C concatenates the Result$_1$, Result$_2$, and Result$_3$ bit strings to generate the filter string 2516 of FIG. 25.

FIG. 26 thus illustrates generation of a query execution plan for a query. In a particular embodiment, the query execution plan is generated prior to performing any set operations. The query execution plan may be generated so as to increase the number of parallel operations and reduce the number of bit string (or slice) transfers between nodes, which may result in improved query execution latency.

Figure 27:
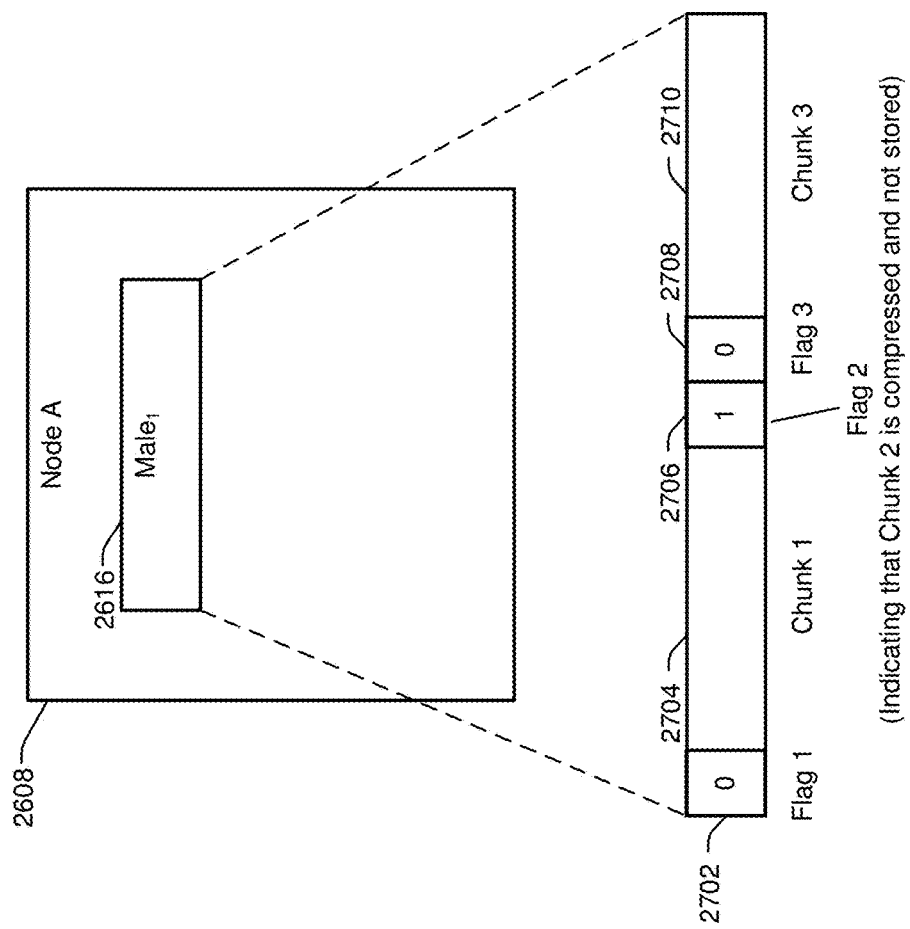
FIG. 27 is a diagram to illustrate a particular embodiment of a method of compressing and storing a bit string of a bitmap index.

In the foregoing description, bit strings are described as being subdivided into slices. For example, each slice may include 64 kibibits (1 kibibit=$2^{10}$ bits=1,024 bits). In a particular embodiment, slices may be further divided into "chunks." For example, chunks may be up to 2 kibibits in length (e.g., each slice is subdivided into 32 chunks). To reduce the amount of space occupied by bit strings of a bitmap index, chunks may be stored in a compressed fashion. For example, FIG. 27 illustrates a particular embodiment of compressing and storing data of a bitmap index. In particular, FIG. 27 depicts Node A 2608 of FIG. 26, which stores the Male$_1$ slice 2616. The Male$_1$ slice 2616 may be compressed in accordance with various compression schemes. In the illustrated compression scheme, chunks that have only zeroes are not stored. Chunks that include a one are stored. A flag corresponding to each chunk is stored. If a flag has a value of zero, the corresponding chunk is stored in its entirety. For example, a first flag 2702 and a third flag 2708 have a value of zero, indicating that corresponding first chunk 2704 and third chunk 2710 are stored at Node A 2608. If a flag has a value of one, the corresponding chunk is "compressed" by not being stored. For example, a second flag 2706 has a value of one, indicating that a corresponding second chunk includes only zeroes and is not stored. During queries, the second chunk may be dynamically generated by introducing zeroes (e.g., 2,048 zeroes) between the first chunk 2704 and the third chunk 2710.

While FIG. 27 illustrates one example of a compression scheme, in alternate embodiments, different compression schemes may be used. Further, data for the compression scheme may be stored in different places. For example, the chunks 2704 and 2710 may be stored at Node A 2608, and the flags 2702, 2706, and 2708 may be stored in a different location (e.g., as part of a hash table that is used to identify where slices/chunks of a bit string are stored).

FIGS. 20-27 thus illustrate various examples of storing, updating, and querying a bitmap index. In particular embodiments, such operations may enable adjusting biclique computation in accordance with the present disclosure. As a first illustrative example, because slices of bit strings may be distributed across multiple storage nodes, the biclique_find procedure of FIGS. 3-19 may be called on a set of slices on a particular storage node rather than on the bitmap index as a whole. Consequently, although the resulting bicliques may not be truly maximal, they may be computed faster and nonetheless represent valuable information from an analytics perspective. Alternatively, even when the biclique_find procedure is called on the bitmap index as a whole, the fact that slices of bit strings are distributed across node may enable various set operations performed by the biclique_find procedure to be performed in parallel, which may provide improved performance.

As another example, when a first storage node receives a request to determine bicliques in a graph, the first storage node may identify the bit string portions (e.g., slices) of a bitmap index that are stored at the first storage node, and may execute the biclique_find procedure based on the locally stored bit string portions. The first storage node may also forward the request to one or more other storage nodes that store other bit string portions of the bitmap index for computation of additional bicliques. Each time the biclique_find procedure executing on a storage node outputs a biclique, the result may be collected (e.g., by the first storage node). If the combination of tiles included in the result has not previously been output in response to the initial request to determine bicliques, then the result may be output and the tile combination may be saved for future reference. Thus, in this example, the first storage node may maintain state information indicating which tile combinations have been previously output. Tile uniqueness rather than profile uniqueness may be used because multiple storage nodes may store slices of roughly the same set of tiles, albeit for different profile ID ranges. In some examples, additional post-processing may be performed to determine which of the result bicliques are maximal, and then determine an associated set of profile IDs using a set intersection operation. Alternatively, or in addition, filtering and pruning on biclique results and/or during execution of the biclique_find procedure may be performed (e.g., to restrict results to having X profiles or Y tiles). As another example, a scoring metric may be applied, and only biclique results having greater than a threshold score may be output.

As yet another example, the top-N functionality of the bitmap index may be used to restrict the search space (e.g., the parameters G, P, and/or L in the biclique_find procedure) to tiles that have high counts, and are therefore more likely to be part of interesting bicliques. Moreover, the top-N functionality may be used in conjunction with custom segment functionality to "target" a maximal biclique search at a particular segment of interest. To illustrate, females between the ages of 25-34 may be considered a valuable demographic for mobile device marketing. A segment corresponding to this group may be identified by querying the bitmap index, and then the biclique_find procedure may be called on the segment rather than on the bitmap index as a whole. The resulting bicliques may indicate what other attributes most strongly correlate the various members of this valuable segment, which may provide insight on how to target marketing material to such users. As yet another example, a sports franchise may request computation of maximal bicliques that include a "season ticket holder" tile to identify the various "personas" associated with season ticket holder. Such personas may include "middle aged homeowner with family," "ticket reseller," etc. The franchise may implement different marketing and customer engagement initiatives for different personas.

It will be appreciated that the bitmap index described herein may be dynamic in nature as additional event signals are received, additional users are registered, etc. Each such event corresponds to the addition or removal of an edge or a node from the graph represented by the bitmap index. Thus, as the bitmap index changes, the bicliques and maximal bicliques identified based on the bitmap index may also change. In a particular embodiment, rather than recomputing bicliques periodically or each time the bitmap index changes, the biclique_find procedure of FIGS. 3-19 may be called on a smaller search space that is likely to be affected by newly received event signal(s). As an illustrative non-limiting example, if an event signal results in modifying a bit string for a particular tile, then the biclique_find procedure may be called to: 1) check if any new maximal bicliques including the tile exist, and 2) check if any maximal bicliques including the tile remain maximal. In an alternative embodiment, bicliques may be recomputed across the entire bitmap index periodically, when the bitmap index changes, or when at least a threshold number of changes to the bitmap index have occurred.

The data-driven persona discovery process described herein may be preferable to using other computation technologies. For example MapReduce is a computation model in which: 1) a one-to-one map operation is performed on all elements of a set, and 2) a reduce operation is performed to generate an aggregate value based on the mapped data. MapReduce generally relies on the assumption that it is faster to move code than data. Therefore, code is collocated with data elements for the map operation, and then data is moved as needed for the reduce operation. Consequently, MapReduce best practices involve a "map more, reduce less" paradigm. However, in MapReduce, only the reduce operation is aware of other data elements; the map operation is individually performed over each data element independent of any other data elements. This lack of "neighbor" awareness until the reduce operation, along with the general preference to "map more, reduce less," renders MapReduce ineffective to computing maximal bicliques as described herein, including identifying all nodes connected to a particular node or whether a first node is connected to every node that a second node is connected to.

Figure 28:
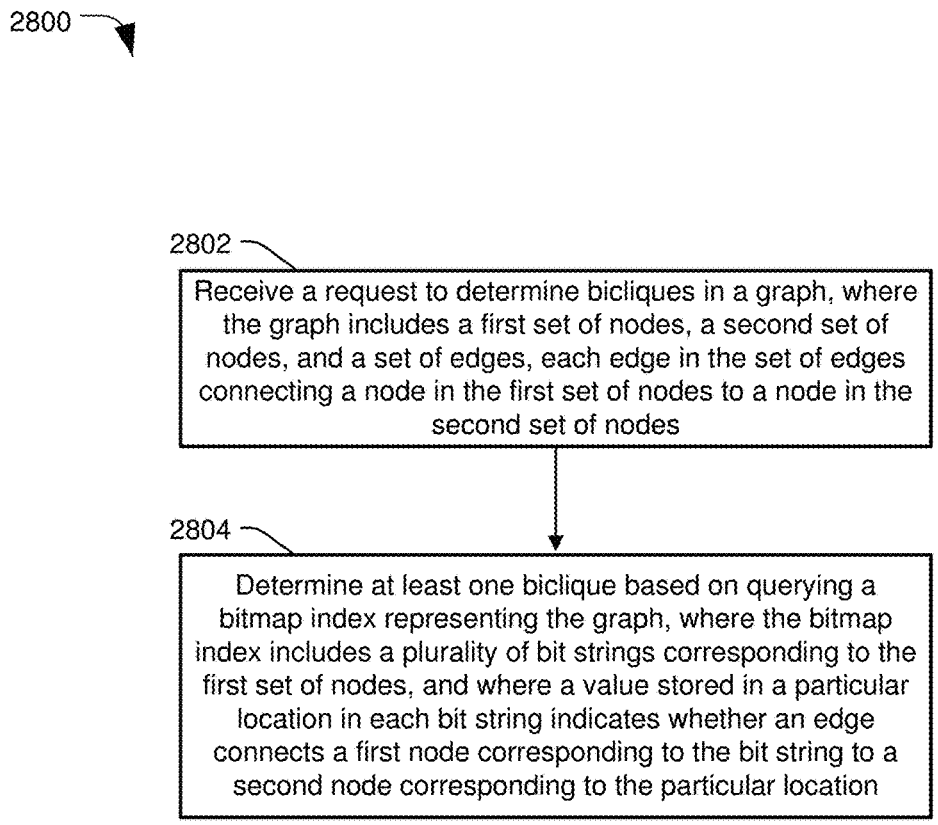
FIG. 28 is a flowchart to illustrate a particular embodiment of a method of using a bitmap index to determine bicliques.

Referring to FIG. 28, a particular embodiment of a method 2800 of using a bitmap index to determine bicliques is shown. In an illustrative embodiment, the method 2800 may be performed by a computing device having a processor, such as a computing device included in the measurement system 120 of FIG. 1.

The method 2800 includes receiving a request to determine bicliques in a graph, at 2802. The graph includes a first set of nodes, a second set of nodes, and a set of edges, where each edge in the set of edges connecting a node in the first set of nodes to a node in the second set of nodes. In an illustrative example, receiving the request may include receiving a request to execute the biclique_find procedure of FIGS. 3-19. Such a request may be received via user input or may be generated automatically at the measurement system 120 of FIG. 1.

The method 2800 also includes determining at least one biclique based on querying a bitmap index representing the graph, at 2804. In a particular embodiment, the bitmap index already exists when the request to determine bicliques is received. Alternatively, at least a portion of the bitmap index is generated or updated prior to determining the bicliques. The bitmap index includes a plurality of bit strings corresponding to the first set of nodes, and a value stored in a particular location in each bit string indicates whether an edge connects a first node corresponding to the bit string to a second node corresponding to the particular location.

Figure 29:
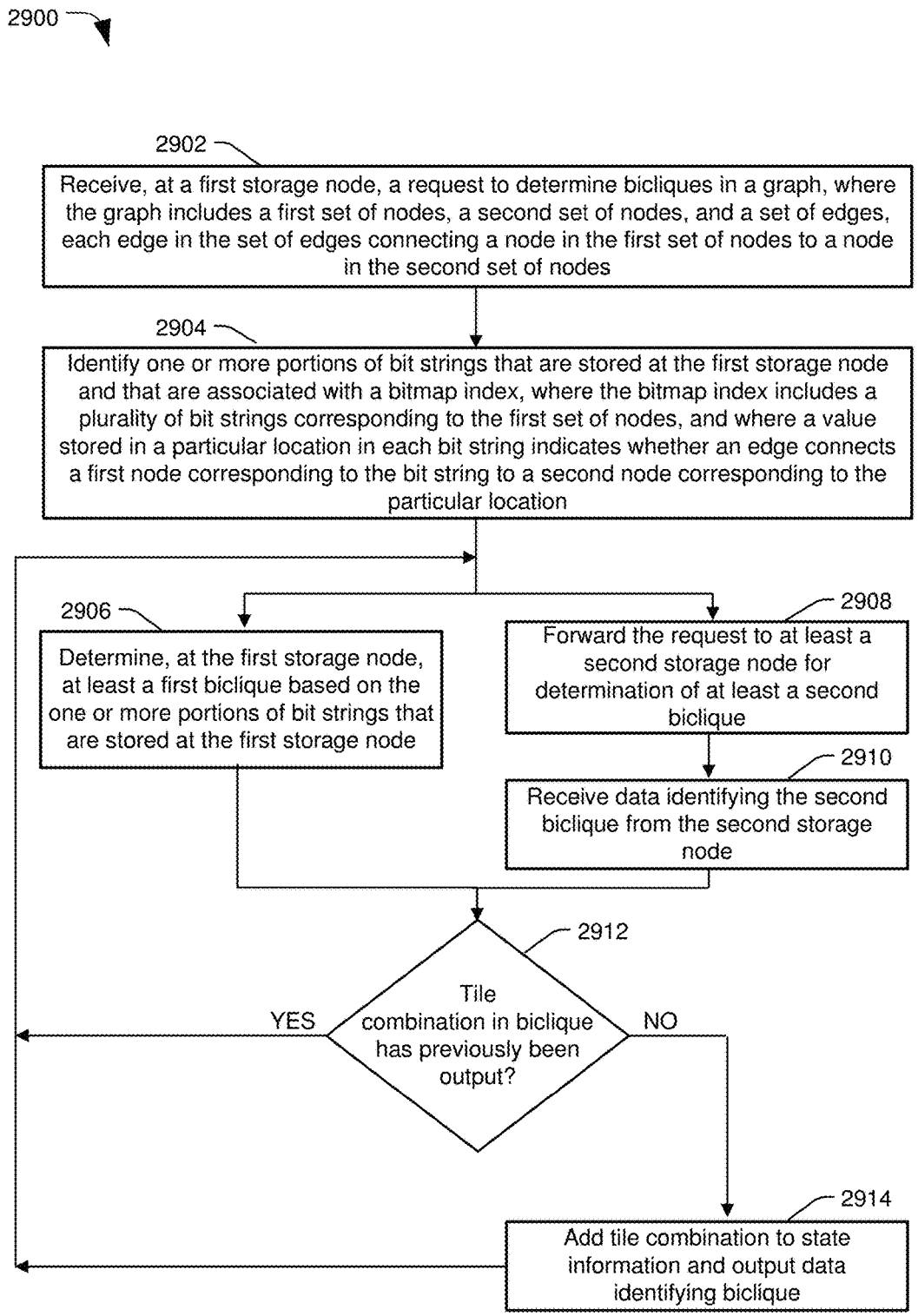
FIG. 29 is a flowchart to illustrate another particular embodiment of a method of using a bitmap index to determine bicliques.

Referring to FIG. 29, another particular embodiment of a method 2900 of using a bitmap index to determine bicliques is shown. In an illustrative embodiment, the method 2900 may be performed by a computing device having a processor, such as a computing device included in the measurement system 120 of FIG. 1 or one of the storage nodes of FIG. 26.

The method 2900 includes receiving, at a first storage node, a request to determine bicliques in a graph, at 2902. The graph includes a first set of nodes, a second set of nodes, and a set of edges, each edge in the set of edges connecting a node in the first set of nodes to a node in the second set of nodes. The method 2900 also includes identifying one or more portions of bit strings that are stored at the first storage node and that are associated with a bitmap index, at 2904. The bitmap index includes a plurality of bit strings corresponding to the first set of nodes, and a value stored in a particular location in each bit string indicates whether an edge connects a first node corresponding to the bit string to a second node corresponding to the particular location. In an illustrative non-limiting example, the request specifies the graph and/or the bitmap index by virtue of specifying a media property (e.g., website), a data set, etc. corresponding to the bitmap index.

The method 2900 further includes determining biclique(s) at the first storage node, at 2906, and forwarding the request to at least a second storage node for computation of at least a second biclique, at 2908. The biclique(s) determined at the first storage node may be determined based on the one or more portions of bit strings stored at the first storage node. When the second storage node identifies a second biclique, the first storage node may receive data identifying the second biclique, at 2910.

Continuing to 2912, the method 2900 includes determining whether a tile combination (i.e., bit string combination) in a biclique has previously been output for the request, at 2912. If not, the method 2900 includes adding the tile combination to state information being maintained at the first node and outputting data identifying the biclique, at 2914. If the tile combination has previously been output, or after outputting the biclique, the method 2900 returns to 2906/2908 and repeats until biclique computation is completed at all storage nodes operating on the request.

Figure 30:
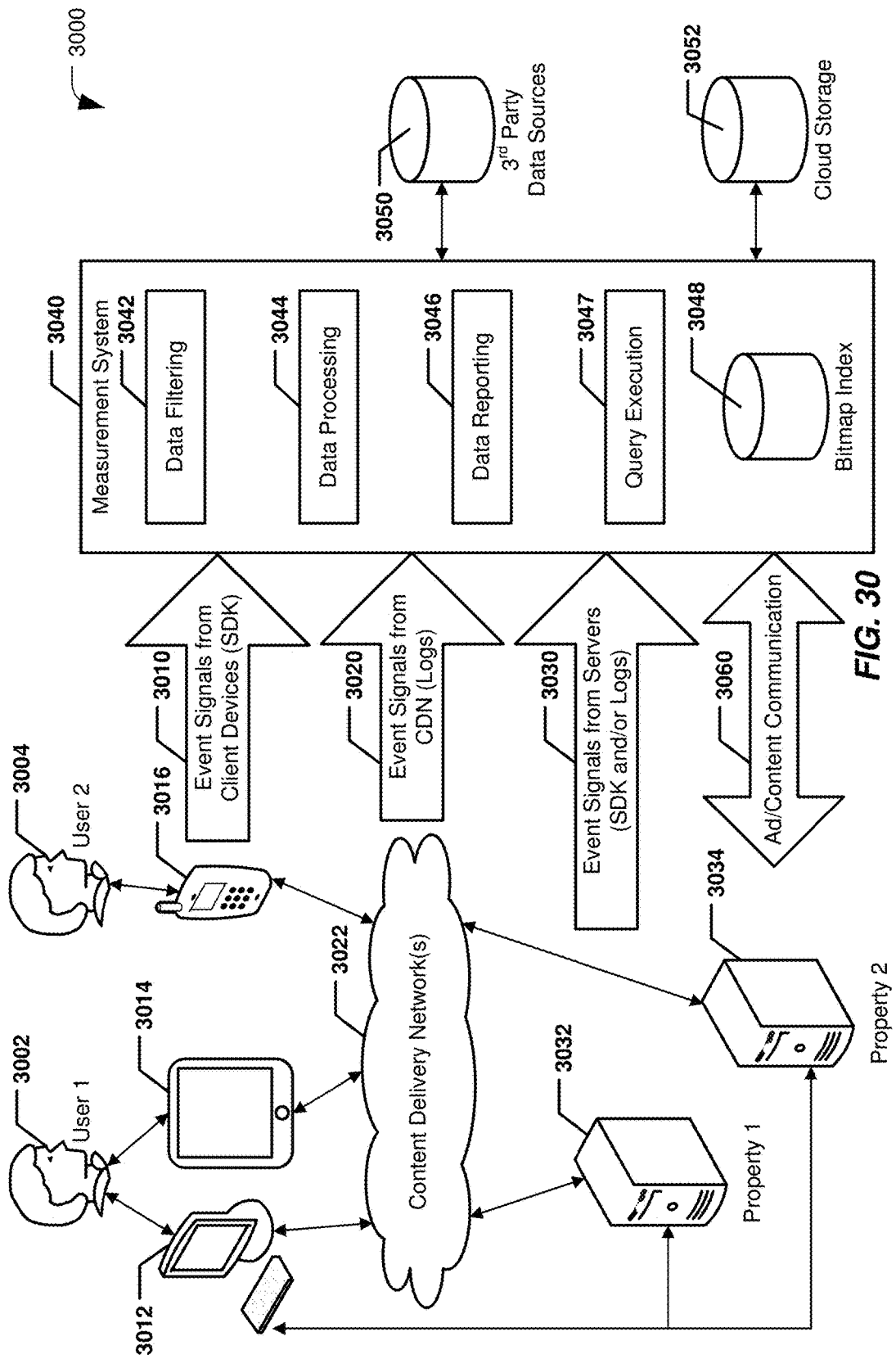
FIG. 30 is a diagram to illustrate a particular embodiment of an audience measurement system that is operable to generate and use a bitmap index.

The bitmap index described herein may thus enable a measurement system, such as the measurement system 120, to quickly provide analysis for "raw" data stored in an offsite (e.g., cloud-based) storage location. The bitmap index may represent an on-the-fly index of binary representations of different audience traits that can be mined to determine what set of audience members is most likely to be receptive to particular content, a particular advertisement, etc. Audience traits may be combined into long bit strings, where each bit string represents a single trait for an entire audience. By keeping the bitmap index "hot" in memory, ad-hoc queries, including computation of bicliques and maximal bicliques, may be performed efficiently and with reduced latency. The described techniques may also be used with other types of systems. For example, in alternate embodiments, the same location in each bit string of the bitmap index may correspond to an identifier other than a user ID, such as an inventory number, an employee number, a hospital patient identifier, etc. FIGS. 30 and 31 illustrate additional scenarios in which a bitmap index may be generated and used.

In particular, FIG. 30 illustrates an alternate embodiment of a measurement system and is generally designated 3000. A measurement system 3040 may be communicatively coupled to one or more user devices (e.g., illustrative user devices 3012, 3014, and 3016), to one or more content delivery networks (CDNs) (e.g., illustrative CDN 3022), and to properties (e.g., websites) 3032 and 3034. In FIG. 30, the properties 3032 and 3034 are illustrated by corresponding servers (e.g., web servers). The measurement system 3040 may be implemented using one or more computing devices (e.g., servers). For example, such computing devices may include one or more processors or processing logic, memories, and network interfaces. The memories may include instructions executable by the processors to perform various functions described herein. The network interfaces may include wired and/or wireless interfaces operable to enable communication to local area networks and/or wide area networks (e.g., the Internet).

The user devices 3012-3016 may be associated with various users. For example, the desktop computing device 3012 and the tablet computing device 3014 may be associated with a first user 3002, and the mobile telephone device (e.g., smartphone) 3016 may be associated with a second user 3004. It should be noted that the user devices 3012-3016 are shown for example only and are not to be considered limiting. In alternate embodiments, fewer, additional, and/or different types of user devices may be present in the system 3000. For example, a radio-frequency identification (RFID)-enabled device may be carried by a user and may transmit a signal in response to detecting that the user is visiting a particular physical location. In a particular embodiment, the user devices 3012-3016 may execute applications that are operable to access the properties 3032 and 3034. For example, the user devices 3012-3016 may include applications developed using a mobile software development kit (SDK) that includes support for audience measurement functions. To illustrate, when the SDK-based applications interact with the properties 3032 and 3034, the applications may generate first event signals 3010 that are transmitted by the user devices 3012-3016 to the measurement system 3040.

The first event signals 3010 may include information identifying specific interactions by the users 3002-3004 via the user devices 3012-3016 (e.g., what action was taken at a media property, when the action was taken, for how long the action was taken, etc.). The user interactions may include interactions with advertisements presented by the media property and/or interactions with content presented by the media property. The event signals 3010 may also include an identifier, such as a browser identifier (browser ID) generated by the SDK. In a particular embodiment, browser identifiers are unique across software installations and devices. For example, a first installation of a SDK-based application at the desktop computing device 3012 and a second installation of the same SDK-based application at the tablet computing device 3014 may use different browser IDs, even though both installations are associated with the same user 3002.

In another particular embodiment, Browser IDs may remain consistent until applications or web browsers are "reset" (e.g., caches/cookies are cleared). In some embodiments, the user devices 3012-3016 may execute applications other than browser applications, such as downloadable mobile applications, that generate the event signals 3010 based on user interactions with advertisements and/or content presented by the applications.

The user devices 3012-3016 may access content provided by the properties 3032 and 3034 directly or via the CDN 3022. The CDN 3022 may provide distributed, load-balanced access to audio, video, graphics, and web pages associated with the media properties 3032 and 3034. For example, the CDN 3022 may include geographically distributed web servers and media servers that serve Internet content in a load-balanced fashion. The CDN 3022 may send second event signals 3020 to the measurement system 3040. The second event signals 3020 may include information identifying interactions with media properties and browser IDs provided to the CDN 3022 by the user devices 3012-3016 and/or the properties 3032 and 3034. For example, the second event signals 3020 may include CDN logs or data from CDN logs.

The media properties 3032 and 3034 may be controlled by the same entity (e.g., may be part of a federated property) or by different entities. The properties 3032 and 3034 may send third event signals 3030 to the measurement system 3040. The third event signals 3030 may include information identifying interactions with the media properties and browser IDs provided by the user devices 3012-3016 during communication with the properties 3032 and 3034 (e.g., communication via hypertext transfer protocol (HTTP), transport control protocol/internet protocol (TCP/IP), or other network protocols).

In a particular embodiment, the third event signals 3030 may include server logs or data from server logs. Alternately, or in addition, the third event signals 3030 may be generated by SDK-based (e.g., web SDK-based) applications executing at the properties 3032 and 3034, such as scripts embedded into web pages hosted by the properties 3032 and 3034.

The first event signals 3010 from the user devices 3012-3016 and the second event signals 3020 generated by the CDN 3022 may be considered "first-party" event signals. The third event signals 3030 from the properties 3032 and 3034 may be considered "third-party" event signals. First party event signals may be considered more trustworthy and reliable than third party event signals, because of the possibility that third party event signals could be modified by a media property owner prior to transmission to the measurement system 3040.

In a particular embodiment, the properties 3032 and 3034 may send data to the measurement system 3040 and receive data from the measurement system 3040 regarding advertisements and/or content presented by the properties 3032 and 3034. Such communication is illustrated in FIG. 30 as advertisement/content communication 3060. For example, an advertisement (or software associated with the advertisement that is executing on a client device, such as web server, a computer, a mobile phone, a tablet device, etc.) may collect and transmit data on a per-advertisement, per-user basis. The data may include or identify a profile of a user, a duration that the user viewed the advertisement, action(s) performed by the user with respect to the advertisement, etc. As another example, a content item or software associated therewith may collect and transmit data regarding user interactions with the content item.

In a particular embodiment, the measurement system 3040 includes a data filtering module 3042, a data processing module 3044, a data reporting module 3046, and a query execution module 3047. In a particular embodiment, each of the modules 3042-3047 is implemented using instructions executable by one or more processors at the measurement system 3040.

The data filtering module 3042 may receive the event signals 3010, 3020, and 3030. The data filtering module 3042 may check the event signals 3010, 3020, and 3030 for errors and may perform data cleanup operations when errors are found. The data filtering module 3042 may also receive and perform cleanup operations on advertisement measurement data and content measurement data received from the properties 3032 and 3034 and from applications executing on the user devices 3012-3016. In a particular embodiment, the data filtering module 3042 may implement various application programming interfaces (APIs) for event signal collection and inspection. The data filtering module 3042 may store authenticated/verified event signals in a database, event cache, archive, and/or cloud storage 3052. In a particular embodiment, the measurement system 3040 includes or has access to a brand database that tracks brands. For example, "raw" data corresponding to the brand database and other collected data may be stored in the cloud storage 3052. Signals received from the properties 3032 and 3034 and from applications executing the user devices 3012-3016 may identify a brand that matches one of the brands in the brand database. The measurement system 3040 may thus track advertisements/content for various brands across multiple properties.

The data processing module 3044 may operate as described with reference to the data processing module 122 of FIG. 1. Alternately, or in addition, the data processing module 3044 may associate received event signals (and interactions represented thereby) with user profiles of users. For example, when an event signal having a particular browser ID is a social networking registration event (e.g., when a user logs into a website using a Facebook® account, a Twitter® account, a LinkedIn® account, or some other social networking account), the data processing module 3044 may retrieve a corresponding social networking profile or other user profile data from third party data sources 3050. Facebook is a registered trademark of Facebook, Inc. of Menlo Park, Calif. Twitter is a registered trademark of Twitter, Inc. of San Francisco, Calif. LinkedIn is a registered trademark of LinkedIn Corp. of Mountain View, Calif.

It will be appreciated that interactions that were previously associated only with the particular browser ID (i.e., "impersonal" alphanumeric data) may be associated with an actual person (e.g., John Smith) after retrieval of the social networking profile or user profile. Associating interactions with individuals may enable qualitative analysis of the audiences of media properties. For example, if John Smith is a fan of a particular sports team, the measurement system 3040 may indicate that at least one member of the audience of the first property 3032 or the second property 3034 is a fan of the particular sports team. When a large percentage of a media property's audience shares a particular characteristic or interest, the media property may use such information in selecting and/or generating advertising or content. User profiles (e.g., a profile of the user John Smith) and audience profiles (e.g., profiles for the media properties associated with the properties 3032 and 3034) may be stored in the cloud storage 3052 and/or in another database. An audience profile for a particular media property may be generated by aggregating the user profiles of the individual users (e.g., including John Smith) that interacted with the particular media property.

Audience profiles may be generated using as few as one or two user profiles, although any number of user profiles may be aggregated. In a particular embodiment, audience profiles may be updated periodically (e.g., nightly, weekly, monthly, etc.), in response to receiving updated data for one or more users in the audience, in response to receiving a request for audience profile data, or any combination thereof. Audience profiles may similarly be generated for audiences of a particular mobile application based on signals generated by installations of the mobile application on various user devices.

The data reporting module 3046 may generate various interfaces. The data reporting module 3046 may also support an application programming interface (API) that enables external devices to view and analyze data collected and stored by the measurement system 3040. In a particular embodiment, the data reporting module 3046 is configured to segment the data.

As used herein, a "segment" is based on a group of people (e.g., an audience or a subset thereof). As further described herein, a digital genome may be determined for each segment. Examples of segments include, but are not limited to, brand affinity segments (also called brand segments), demographic segments, geographic segments, social activity segments, employer segments, educational institution segments, professional group segments, industry category of employer segments, brand affinity category segments, professional skills segments, job title segments, and behavioral segments. In a particular embodiment, behavioral segments are defined by a client (e.g., property owner or publisher) or by the measurement system 3040, and represent actions taken on a client's property.

Additional examples of segments include segments based on an advertisement, an advertisement campaign, an advertisement placement, an advertisement context, a content item, a content context, content placement, a platform (e.g., desktop/laptop computer vs. mobile phone vs. tablet computer), etc. Segments may be used to understand or evaluate characteristics of an audience, craft a content strategy, generate advertising leads, create advertising pitches, and respond to inbound advertising requests. Segments may also be used to acquire additional audience members, receive information from advertisements/content items, and send information to advertisements/content items. In a particular embodiment, the measurement system 3040 may be operable to define "new" segments based on performing logical operations (e.g., logical OR operations and logical AND operations).

The measurement system 3040 may also include a bitmap index 3048 (e.g., the bitmap index 126 of FIG. 1, the bitmap index 220 of FIG. 2, and/or the bitmap index 2050 of FIG. 20). The bitmap index 3048 may store bit strings corresponding to at least a subset of the "raw" data stored in the cloud storage 3052. In one example, a different bitmap index 3048 is maintained for each property 3032, 3034. The bitmap index 3048 for a particular property may include, for each audience member of the property, data regarding a demographic attribute of the audience member, a brand affinity of the audience member, and/or behaviors (e.g., interactions with the media property) of the audience member. The same location in each bit string of the bitmap index 3048 may correspond to the same user.

The data processing module 3044 may also be configured to, upon receiving an event signal, parse the event signal to identify what user and media property the event signal corresponds to. The data processing module 3044 may store data corresponding to the event signal in one or more databases (e.g., the cloud storage 3052, a user profile database, etc.). The data processing module 3044 may also store indexing data corresponding to the event signal in the bitmap index 3048 for the identified media property. If the user is a new audience member for the media property, the data processing module 3044 may assign a new ID to the user. Event signals may be processed as described above with reference to FIGS. 20-27.

The query execution module 3047 may operate as described with reference to the query execution module 124 of FIG. 1 and/or the query execution module 2606 of FIG. 26. For example, the query execution module 3047 may receive a query and generate a query execution plan that parallelizes execution and reduces/minimizes data transfers between storage nodes during query execution.

During operation, the users 3002-3004 may interact with the media properties 3032 and 3034 and with applications executing on the user devices 3012-3016. In response to the interactions, the measurement system 3040 may receive the event signals 3010, 3020, 3030, and/or 3060. Each event signal may include a unique identifier, such as a browser ID and/or an audience member ID. If the user is a "new" audience member, the data processing module 3044 may create a user profile. Data for the user profile may be stored in the cloud storage 3052 and/or the bitmap index 3048. In a particular embodiment, data for the user profile may be retrieved from the third party data sources 3050.

For example, the data processing module 3044 may retrieve and store data from one or more social network profiles of the user. The data may include demographic information associated with the user (e.g., a name, an age, a geographic location, a marital/family status, a homeowner status, etc.), social information associated with the user (e.g., social networking activity of the user, social networking friends/likes/interests of the user, etc.), and other types of data. The data processing module 3044 may also collect and store data associated with advertisements and content served by the properties 3032 and 3034 and by applications executing on the user devices 3012-3016. In a particular embodiment, the measurement system 3040 is further configured to receive offline data from external data sources. For example, the measurement system 3040 may receive data regarding transactions (e.g., purchases) made by an audience and may use the transaction data to generate additional signals that contribute to the digital genome of an audience, brand, property, etc. Another example of offline data may be a "data dump" of data collected by an RFID-enabled device or an RFID detector. Offline data may be stored in one or more computer-readable files that are provided to the measurement system 3040. In a particular embodiment, offline data can include previously collected data regarding users or audience members (e.g., names, addresses, etc.).

The data reporting module 3046 may report data collected by the measurement system 3040. For example, the data reporting module 3046 may generate reports based on an audience profile of a media property (or application), where the audience profile is based on aggregating user profiles of users that interacted with the media property (or application). To illustrate, the data reporting module 3046 may generate an interface indicating demographic attributes of the audience as a whole (e.g., a percentage of audience members that are male or female, percentages of audience members in various age brackets, percentages of audience members in various income bracket, most common audience member cities/states of residence, etc.). The interface may also indicate social attributes of the audience as a whole (e.g., the most popular movies, sports teams, etc. amongst members of the audience). Audience profiles may also be segmented and/or aggregated with other audience profiles, as further described herein. Audience profiles may further be segmented based on advertisement, advertisement campaign, brand, content item, etc. Audience profiles may also be constructed by combining segments, as further described herein.

In a particular embodiment, the system 3000 may also receive event signals based on measurements (e.g., hardware measurements) made at a device. For example, an event signal from the tablet computing device 3014 or the mobile telephone device 3016 may include data associated with a hardware measurement at the tablet computing device 3014 or the mobile telephone device 3016, such as an accelerometer or gyroscope measurement indicating an orientation, a tilt, a movement direction, and/or a movement velocity of the tablet computing device 3014 or the mobile telephone device 3016. As another example, the system 3000 may receive a signal in response to an RFID device detecting that a user is visiting a particular physical location. The system 3000 of FIG. 30 may also link interactions with user profiles of users. This may provide information of "how many" viewers and "how long" the viewers watched a particular video (e.g., as in direct response measurement systems), and also "who" watched the particular video (e.g., demographic, social, and behavioral attributes of the viewers).

The system 3000 of FIG. 30 may thus enable audience measurement and analysis based on data (e.g., event signals) received from various sources. Further, the system 3000 of FIG. 30 may enable real-time or near-real time execution of queries on collected data, such as execution of "top N" queries using the bitmap index 3048.

Figure 31A:
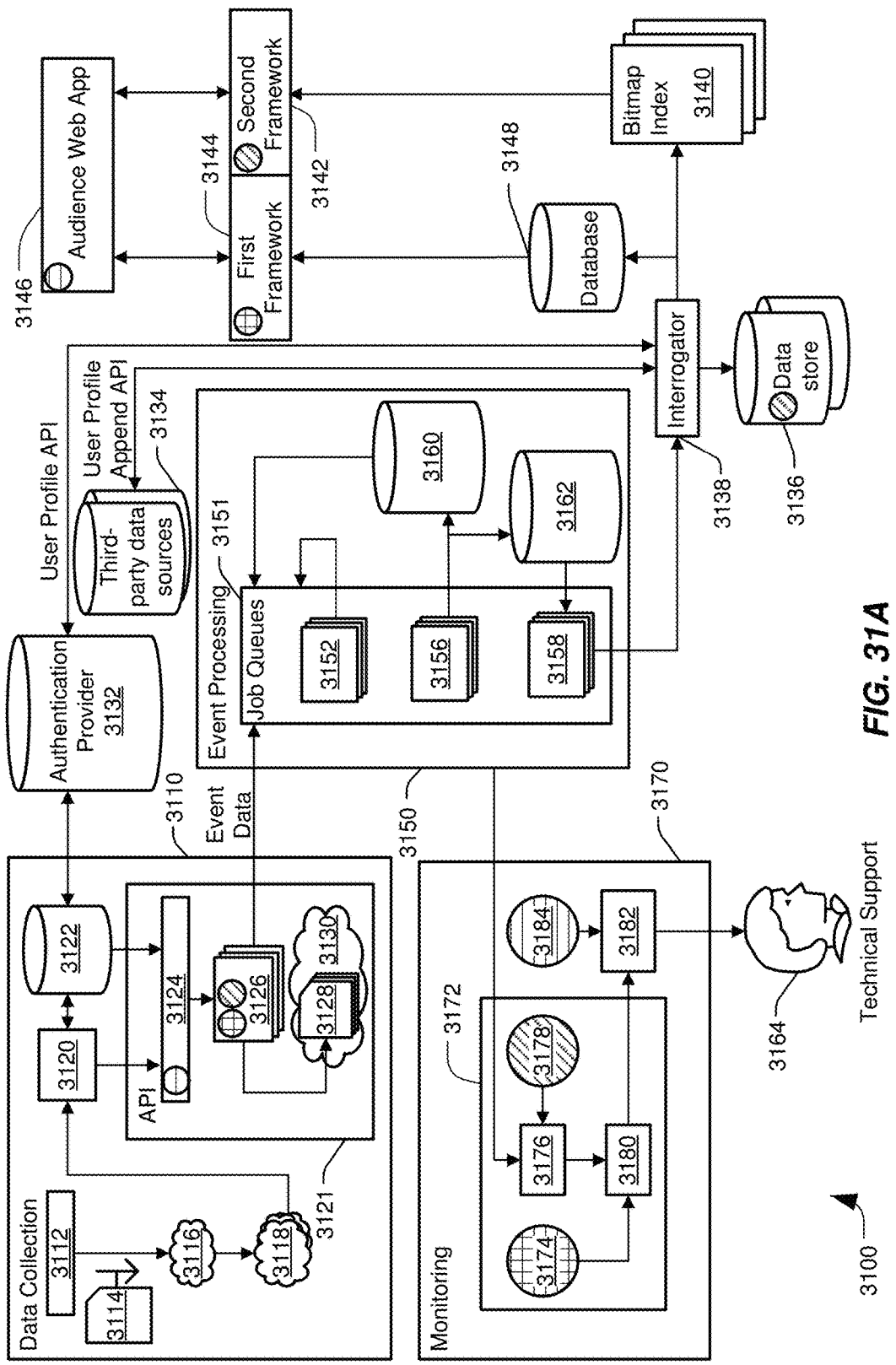
FIGS. 31A, 31B, 31C, and 31D are diagrams to illustrate another particular embodiment of an audience measurement system that is operable to generate and use a bitmap index.
Figure 31B:
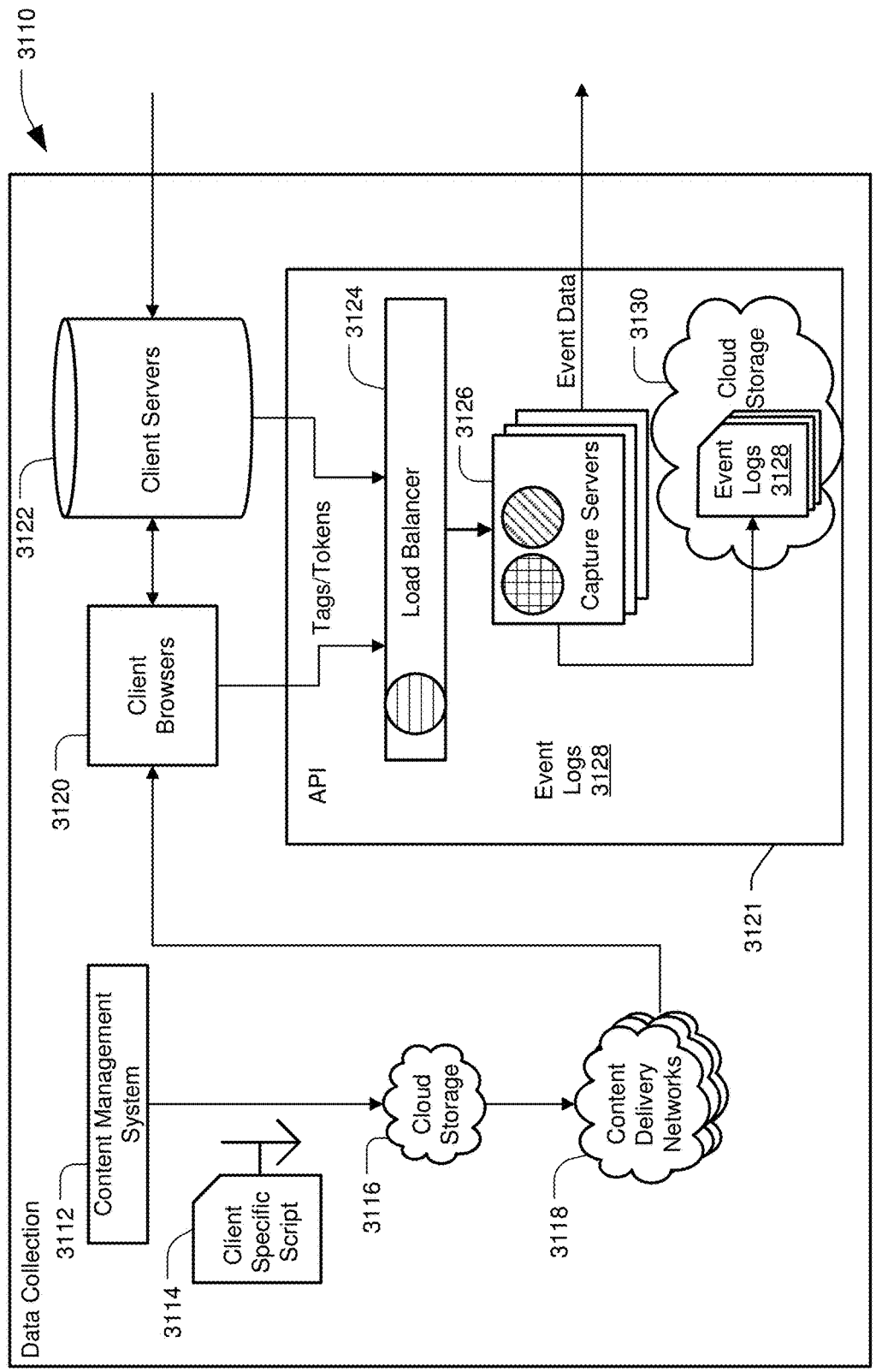
Figure 31C:
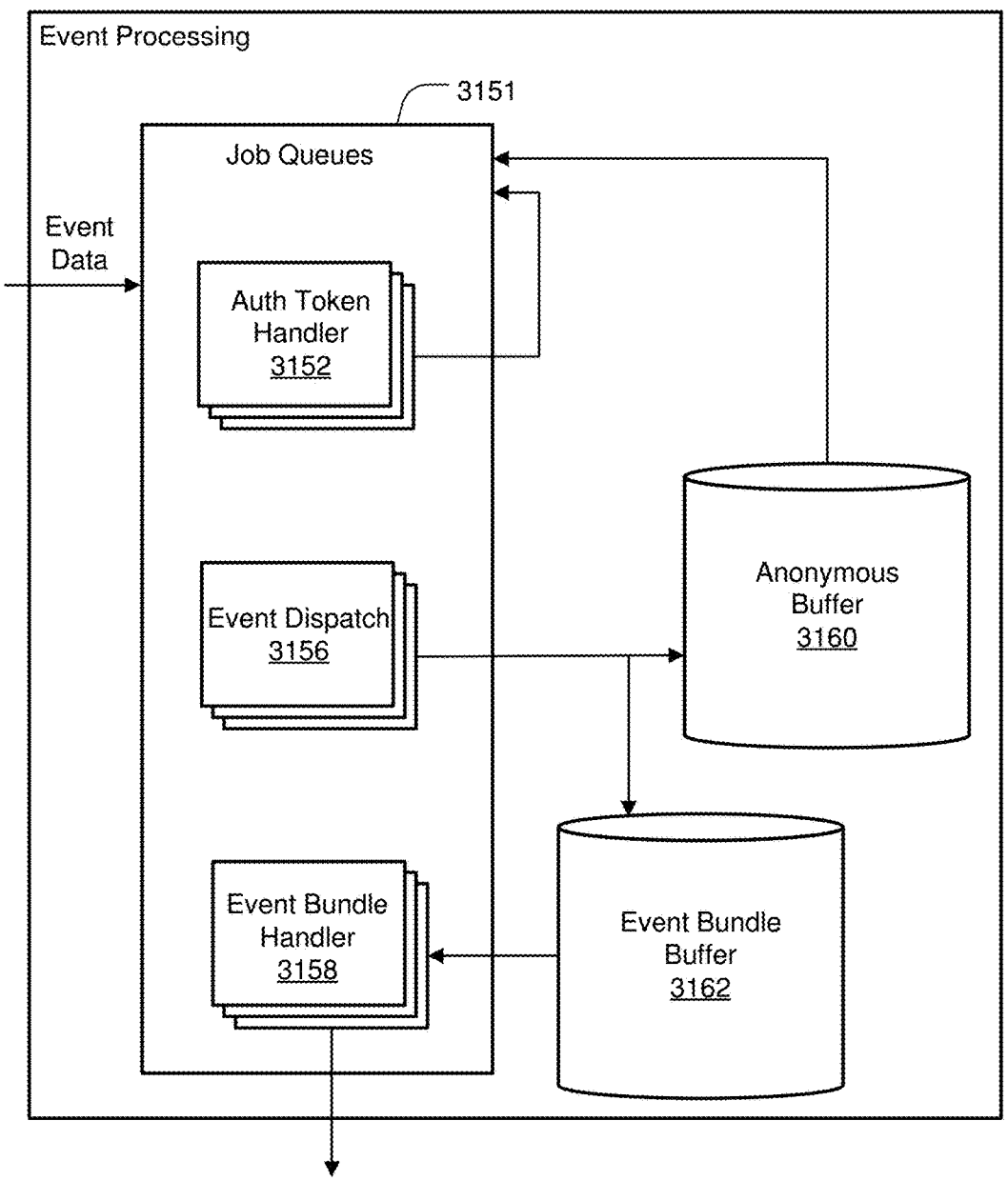
Figure 31D:
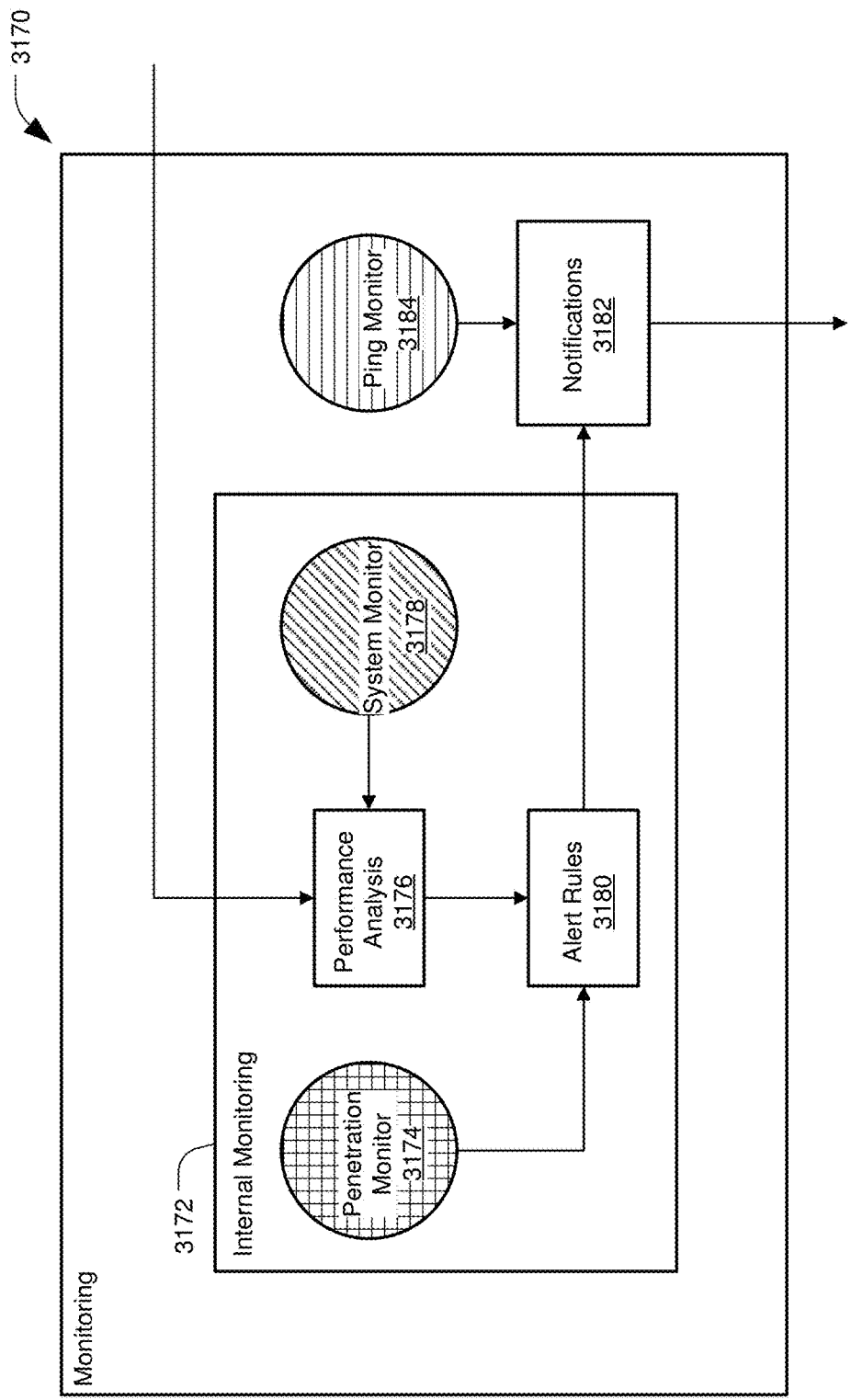

FIG. 31A illustrates another particular embodiment of a system 3100 that is operable to generate and use a bitmap index. The system 3100 includes a data collection tier (e.g., subsystem) 3110, an event processing tier 3150, and a monitoring tier 3170. Components of the data collection tier 3110 are illustrated in further detail in FIG. 31B. Components of the event processing tier 3150 are illustrated in further detail in FIG. 31C. Components of the monitoring tier are illustrated in further detail in FIG. 31D.

The system 3100 includes (or has access to) an authentication provider 3132, third party data sources 3134, an audience web application 3146, a first framework 3144, a second framework 3142, a database 3148, an interrogator 3138, a data store 3136, and a bitmap index 3140. In an illustrative embodiment, the third party data sources 3134 are the third party data sources 3050 of FIG. 30, the event processing tier 3150 and the interrogator 3138 correspond to the data processing module 3044 of FIG. 30, and the bitmap index 3140 is the bitmap index 3048 of FIG. 30.

The data collection tier 3110 includes a content management system (CMS) 3112, cloud storage 3116, content delivery networks 3118, client browsers 3120, and client servers 3122. The data collection tier 3110 may further include an application programming interface (API) 3121. The API 3121 includes a load balancer 3124, capture servers 3126, and cloud storage 3130.

The event processing tier 3150 includes a job queues module 3151, an anonymous buffer 3160, and an event bundle buffer 3162. The job queues module 3151 includes an authentication token handler 3152, an event dispatch 3156, and an event bundle handler 3158. In alternate embodiments, the job queues module 3151 may include more, fewer, and/or different handlers than illustrated in FIG. 31.

The monitoring tier 3170 includes an internal monitoring module 3172, a ping monitor 3184, and a notifications module 3182. The internal monitoring module 3172 includes a penetration monitor 3174, a performance analysis module 3176, a system monitor 3178, and an alert rules module 3180.

During operation, the content management system 3112 may be used to generate a client specific script (e.g., webscript) 3114 for various clients (e.g., media properties). The client specific script 3114 may be stored in the cloud storage 3116 and replicated to the content delivery networks 3118. As audience members register and interact with a media property, the content delivery networks 3118 may deliver the client specific script 3114, along with property content, to the client browsers 3120. Based on the client specific script 3114, the client browsers 3120 may generate tags (e.g., a tag corresponding to a particular user activity, such as watching a video) or tokens (e.g., a social networking registration token). The tags or tokens may be sent to the load balancer 3124. The client servers 3122 may also generate tags or tokens to send to the load balancer 3124 based on user registrations and user activity at media properties. The tags or tokens from the client servers 3122 may be authenticated by the authentication provider 3132.

The load balancer 3124 may send the tags or tokens to the capture servers 3126 based on a load balancing algorithm. The capture servers 3126 may generate event data (e.g., event signals) based on the tags or tokens. The capture servers 3126 may store the event data in event logs 3128 in the cloud storage 3130 and send the event data to the job queues module 3151.

The job queues module 3151 may distribute the event data to different event handler(s) based on the type of the event data. For example, event data including an authentication token may be sent to the authentication token handler 3152. In addition, event data requiring additional information from social media sources may be sent to the authentication token handler 3152. The handler 3152 may perform asynchronous event collection operations based on the received event data. For example, when a new user registers with a media property using a social networking profile, a token may be provided by the data collection tier to the authentication token handler 3152. The handler 3152 may use the token to retrieve demographic and brand affinity data for the user from the user's social networking profile.

Event signals may also be sent to the event dispatch 3156, which determines whether the event signals corresponds to known or unknown users. When event data corresponds to an unknown user, the event dispatch 3156 buffers the event data in the anonymous buffer 3160. After a period of time (e.g., three days), event data from the anonymous buffer 3160 may be sent to the job queues module 3151 to be processed again.

When event data corresponds to a "known" user (e.g., a user that has already been assigned a user ID), the event dispatch 3156 may send the event data to the event bundles buffer 3162. The event bundle handler 3158 may retrieve event data stored in the event bundles buffer 3162 every bundling period (e.g., one hour). The event bundle handler 3158 may bundle event data received each bundling period into an event bundle that is sent to the interrogator 3138.

The interrogator 3138 may parse the event bundle and update the data store 3136, the SQL database 3148, and/or the bitmap index 3140. For example, the interrogator 3138 may perform bitmap index generation and update operations as described herein. In a particular embodiment, the database 3148 corresponds to a profiles database that is accessible the first framework 3144 to the audience web application 3146. For example, the first framework 3144 may be a database-driven framework that is operable to dynamically generate webpages based on data in the database 3148. The audience web application may be operable to generate various graphical user interfaces to analyze the data collected by the system 3100. The bitmap index 3140 may be accessible to the audience web application 3146 via the second framework 3142. In one example, the second framework 3142 supports representational state transfer (REST)-based data access and webpage navigation. Although not shown, in particular embodiments, the data store 3136 may also be accessible to the audience web application 3146.

The monitoring tier 3170 may monitor the various components of the system 3100 during operation to detect errors, bottlenecks, network intrusions, and other issues. For example, the penetration monitor 3174 may collect data indicating unauthorized access to or from the capture servers 3126 and the first framework 3144. The penetration monitor 3174 may provide the data to the alert rules module 3180. Similarly, the system monitor 3178 may collect performance data from the capture servers 3126, from the second framework 3142, and from the data store 3136. The system monitor 3178 may provide the performance data to the performance analysis module 3176, which may analyze the data and send the analyzed data to the alert rules module 3180. The alert rules module 3180 may compare received data to alert rules and, based on the comparison send an alert to the notifications module 3182. For example, the alert rules module 3180 may determine that an intruder has accessed components of the system 3100 or that the system 3100 is not operating at a desired level of efficiency, and may send an alert to the notifications module 3182.

The notifications module 3182 may also receive alerts from the ping monitor 3184. The ping monitor 3184 may monitor the load balancer 3124 and the audience web application 3146 and collect data regarding uptime, downtime, and performance, and provide alerts to the notification module 3182.

The notification module 3182 may send notifications (e.g., via short message service (SMS), e-mail, instant messaging, paging, etc.) to one or more technical support staff members 3164 to enable timely response in the event of errors, performance bottlenecks, network intrusion, etc.

In accordance with various embodiments of the present disclosure, the methods, functions, and modules described herein may be implemented by software programs executable by a computer system. Further, in an exemplary embodiment, implementations can include distributed processing, component/object distributed processing, and parallel processing. Alternatively, virtual computer system processing can be constructed to implement one or more of the methods or functionality as described herein.

Particular embodiments can be implemented using a computer system executing a set of instructions that cause the computer system to perform any one or more of the methods or computer-based functions disclosed herein. A computer system may include a laptop computer, a desktop computer, a mobile phone, a tablet computer, a set-top box, a media player, or any combination thereof. The computer system may be connected, e.g., using a network, to other computer systems or peripheral devices. For example, the computer system or components thereof can include or be included within any one or more devices, modules, and/or components illustrated in FIGS. 1-31. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable or a processor-readable device. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage device. A computer-readable or processor-readable device is not a signal.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    receiving, at a computing device comprising a processor, a request to determine bicliques in a graph, wherein the graph includes a first set of nodes, a second set of nodes, and a set of edges, each edge in the set of edges connecting a node in the first set of nodes to a node in the second set of nodes; and
    determining at least one biclique based on querying a bitmap index representing the graph,
    wherein the bitmap index includes a plurality of bit strings corresponding to the first set of nodes,
    wherein a value stored in a particular location in each bit string indicates whether an edge connects a first node corresponding to the bit string to a second node corresponding to the particular location, and
    wherein determining the at least one biclique includes:
        adding a particular node from the first set of nodes to a third set of nodes;
        adding nodes of the second set of nodes that are connected to the particular node to a fourth set of nodes;
        in response to determining that another node of the first set of nodes is connected to each node in the fourth set of nodes, adding the other node to the third set of nodes; and
        outputting an indication that a combination of the third set of nodes and the fourth set of nodes corresponds to a maximal biclique of the graph.

2. The method of claim 1, wherein the bitmap index represents data stored in a data store.

3. The method of claim 2, wherein the data stored in the data store is determined based on event signals received from devices associated with users that accessed a web site.

4. The method of claim 3, wherein the graph includes nodes corresponding to less than all of the users.

5. The method of claim 3, wherein the graph includes nodes corresponding to a custom segment of the users.

6. The method of claim 3, wherein the graph corresponds to top N signals associated with the website, wherein N is an integer greater than or equal to one.

7. The method of claim 3, wherein the event signals include at least one registration event signal.

8. The method of claim 1, wherein one or more of the plurality of bit strings corresponds to a demographic attribute, a behavior, a brand affinity, or a combination thereof.

9. The method of claim 1, wherein the bitmap index is distributed across a plurality of storage nodes.

10. The method of claim 9, wherein each of the plurality of bit strings is stored as one or more distributed slices, and wherein at least a first slice of a particular bit string of the plurality of bit strings is stored in a different storage node than a second slice of the particular bit string.

11. The method of claim 1, wherein querying the bitmap index includes generating a query execution plan for a query.

12. The method of claim 11, wherein the query execution plan identifies:
    one or more set operations;
    that one or more first storage nodes are to send stored portions of one or more bit strings to a second storage node; and
    that the second storage node is to perform the one or more set operations with respect to:
        the portions of the one or more bit strings received from the one or more first storage nodes; and portions of one or more bit strings stored at the second storage node; and that the second storage node is to concatenate results of performing the one or more set operations to generate a result bit string that indicates a result of the query.

13. An apparatus comprising:
a processor; and
a memory storing instructions executable by the processor to perform operations comprising:
  receiving an event signal, wherein the event signal includes information corresponding to a profile identifier associated with a user;
  modifying a value of at least one bit stored in a bitmap index, wherein the bitmap index corresponds to a graph having a first set of nodes, a second set of nodes, and a set of edges, wherein each edge in the set of edges connecting a node in the first set of nodes to a node in the second set of nodes, wherein the bitmap index includes a plurality of bit strings corresponding to the first set of nodes, and wherein a value stored in a particular location in each bit string indicates whether an edge connects a first node corresponding to the bit string to a second node corresponding to the particular location;
  receiving a request to determine bicliques in the graph, wherein the request specifies a target segment of users; and
  determining at least one biclique based on querying the bitmap index.

14. The apparatus of claim 13, wherein the bitmap index represents data stored in a data store.

15. The apparatus of claim 14, wherein the data stored in the data store represents users that accessed a website, wherein the target segment of users corresponds to fewer than all of the users that accessed the website.

16. The apparatus of claim 13, wherein the bitmap index is distributed across a plurality of storage nodes.

17. The apparatus of claim 16, wherein each of the plurality of bit strings is stored as one or more distributed slices, and wherein at least a first slice of a particular bit string is stored in a different storage node than a second slice of the particular bit string.

18. A computer readable storage device storing instructions that, when executed, cause a computer to perform operations comprising:
  receiving, at a first storage node, a request to determine bicliques in a graph, wherein the graph includes a first set of nodes, a second set of nodes, and a set of edges, each edge in the set of edges connecting a node in the first set of nodes to a node in the second set of nodes;
  identifying one or more portions of bit strings that are stored at the first storage node and that are associated with a bitmap index, wherein the bitmap index includes a plurality of bit strings corresponding to the first set of nodes, and wherein a value stored in a particular location in each bit string indicates whether an edge connects a first node corresponding to the bit string to a second node corresponding to the particular location;
  determining, at the first storage node, at least a first biclique based on the one or more portions of bit strings that are stored at the first storage node;
  forwarding the request to at least a second storage node for determination of at least a second biclique;
  receiving data identifying the second biclique from the second storage node; and
  outputting data identifying the first biclique and the data identifying the second biclique in response to the request.

19. The computer readable storage device of claim 18, wherein the bitmap index is generated by a measurement system, and wherein the graph corresponds to at least one of:
  less than all users tracked by the measurement system,
  a custom segment of the users tracked by the measurement system, or
  top N signals associated tracked by the measurement system, wherein N is an integer greater than or equal to one.

* * * * *